(12) United States Patent
Ozeki

(10) Patent No.: US 10,960,930 B2
(45) Date of Patent: Mar. 30, 2021

(54) ASSEMBLING STRUCTURE OF ENGINE AND VEHICLE

(71) Applicant: SUZUKI MOTOR CORPORATION, Hamamatsu (JP)

(72) Inventor: Hisashi Ozeki, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 16/447,548

(22) Filed: Jun. 20, 2019

(65) Prior Publication Data
US 2020/0047814 A1 Feb. 13, 2020

(30) Foreign Application Priority Data
Aug. 8, 2018 (JP) .............................. JP2018-149462

(51) Int. Cl.
| | |
|---|---|
| *B62D 25/08* | (2006.01) |
| *F01L 1/053* | (2006.01) |
| *F01L 1/26* | (2006.01) |
| *F01L 1/047* | (2006.01) |
| *F01L 1/344* | (2006.01) |

(52) U.S. Cl.
CPC ............ *B62D 25/082* (2013.01); *F01L 1/053* (2013.01); *F01L 1/267* (2013.01); *B60Y 2200/12* (2013.01); *F01L 2001/0471* (2013.01); *F01L 2001/34426* (2013.01)

(58) Field of Classification Search
CPC .......... F01P 3/207; F01P 5/10; F01P 11/0276; F01P 2060/12; F01P 2003/001; F01P 2060/04; F01P 2050/06; F02B 33/36; F01M 5/002; F02F 7/007; B63H 21/14
See application file for complete search history.

(56) References Cited

U.S. PATENT DOCUMENTS

| | | | | |
|---|---|---|---|---|
| 6,164,257 | A * | 12/2000 | Kobayashi | ............... F01M 1/16 |
| | | | | 123/193.3 |
| 2010/0300795 | A1 | 12/2010 | Adachi et al. | ................. 180/291 |
| 2016/0144924 | A1* | 5/2016 | Sugita | .................... B62K 11/04 |
| | | | | 180/227 |

FOREIGN PATENT DOCUMENTS

| | | |
|---|---|---|
| JP | 5345448 B2 | 8/2013 |
| WO | WO-2015029663 A1 * 3/2015 | ............... F16B 31/04 |

\* cited by examiner

*Primary Examiner* — Jacob M Amick
*Assistant Examiner* — Charles Brauch
(74) *Attorney, Agent, or Firm* — Stein IP, LLC

(57) ABSTRACT

There is provided an assembling structure of an engine. An oil control valve unit is configured to control oil pressure in a variable valve timing device of the engine. The oil control valve unit is installed on a cylinder head. The cylinder head is assembled to a crankcase. An outer wall of the cylinder head is formed with an opening into which the oil control valve unit is partially inserted. A mating surface of the cylinder head and the crankcase is fastened by at least a pair of bolts spaced apart across the opening.

10 Claims, 15 Drawing Sheets

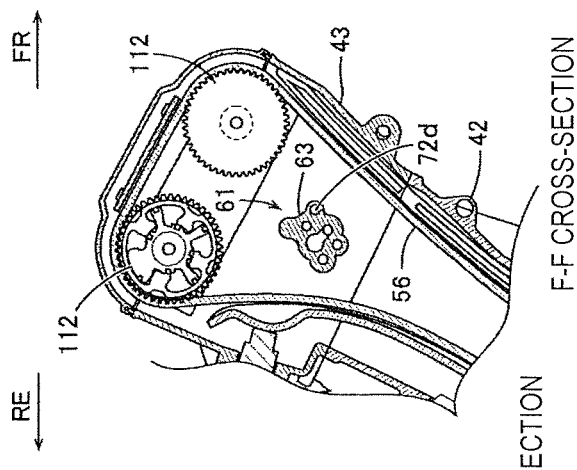
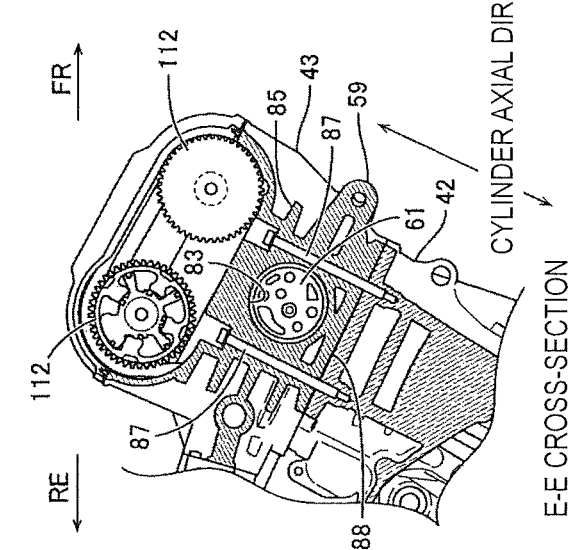
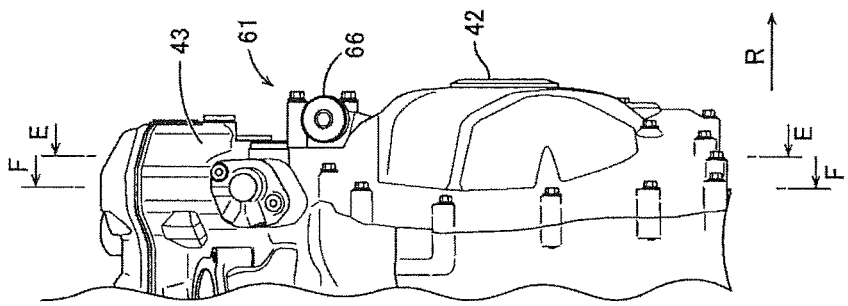

ASSEMBLING STRUCTURE OF ENGINE AND VEHICLE

CROSS-REFERENCE TO RELATED APPLICATIONS

The disclosure of Japanese Patent Application No. 2018-149462 filed on Aug. 8, 2018, including specification, drawings and claims is incorporated herein by reference in its entirety.

TECHNICAL FIELD

The present disclosure relates to an assembling structure of an engine and a vehicle.

BACKGROUND

In recent years, engines in which a variable valve timing device configured to control valve timings of an intake valve and an exhaust valve in correspondence to a driving state of an engine is mounted for high output, low-fuel consumption and low exhaust gas have been increasingly used. In this type of engines, an engine has been known in which a hydraulic pressure in the variable valve timing device is controlled with an oil control valve unit installed on an outer surface of a cylinder (for example, see Patent Document 1). The variable valve timing device is supplied with oil from the oil control valve unit, and the valve timing is adjusted by changing the rotational phase of a camshaft with respect to a crankshaft to an advance side or a retard side.
Patent Document 1: Japanese Patent No. 5345448 B In such an engine, an opening into which an oil control valve unit is partially inserted is formed in an outer wall of a cylinder head, and the rigidity of the outer wall of the cylinder head is reduced by an amount of the opening. Therefore, it is desirable to firmly fix the cylinder head to a crankcase and ensure fastening rigidity between the crankcase and the cylinder head to suppress vibration noise.

SUMMARY

It is at least one of objects of the present disclosure to provide an assembling structure of an engine capable of ensuring fastening rigidity of a cylinder head and a crankcase without hindering the attachment of the oil control valve, and a vehicle.

According to an aspect of the embodiments of the present disclosure, there is provided an assembling structure of an engine in which a cylinder head on which an oil control valve unit configured to control oil pressure to a variable valve timing device of the engine is installed is assembled to a crankcase, wherein an outer wall of the cylinder head is formed with an opening into which the oil control valve unit is partially inserted, and a mating surface of the cylinder head and the crankcase is fastened by at least a pair of bolts spaced apart across the opening.

The cylinder head and the crankcase are fastened by the pair of bolts so as to avoid the opening of the cylinder head. It is possible to ensure the fastening rigidity of the cylinder head and the crankcase without hindering the attachment of the oil control valve unit by the pair of bolts. Even if the opening is formed in the outer wall of the cylinder head, the rigidity of the cylinder head is not significantly reduced and the fastening rigidity of the cylinder head and the crankcase is also high, so that the vibration noise can be reduced.

BRIEF DESCRIPTION OF THE DRAWINGS

In the accompanying drawings:
FIGS. 12A to 12C are illustrative views of a fastening structure of the cylinder head and a crankcase according to the present embodiment.

DETAILED DESCRIPTION OF THE EMBODIMENTS

Figure 1:
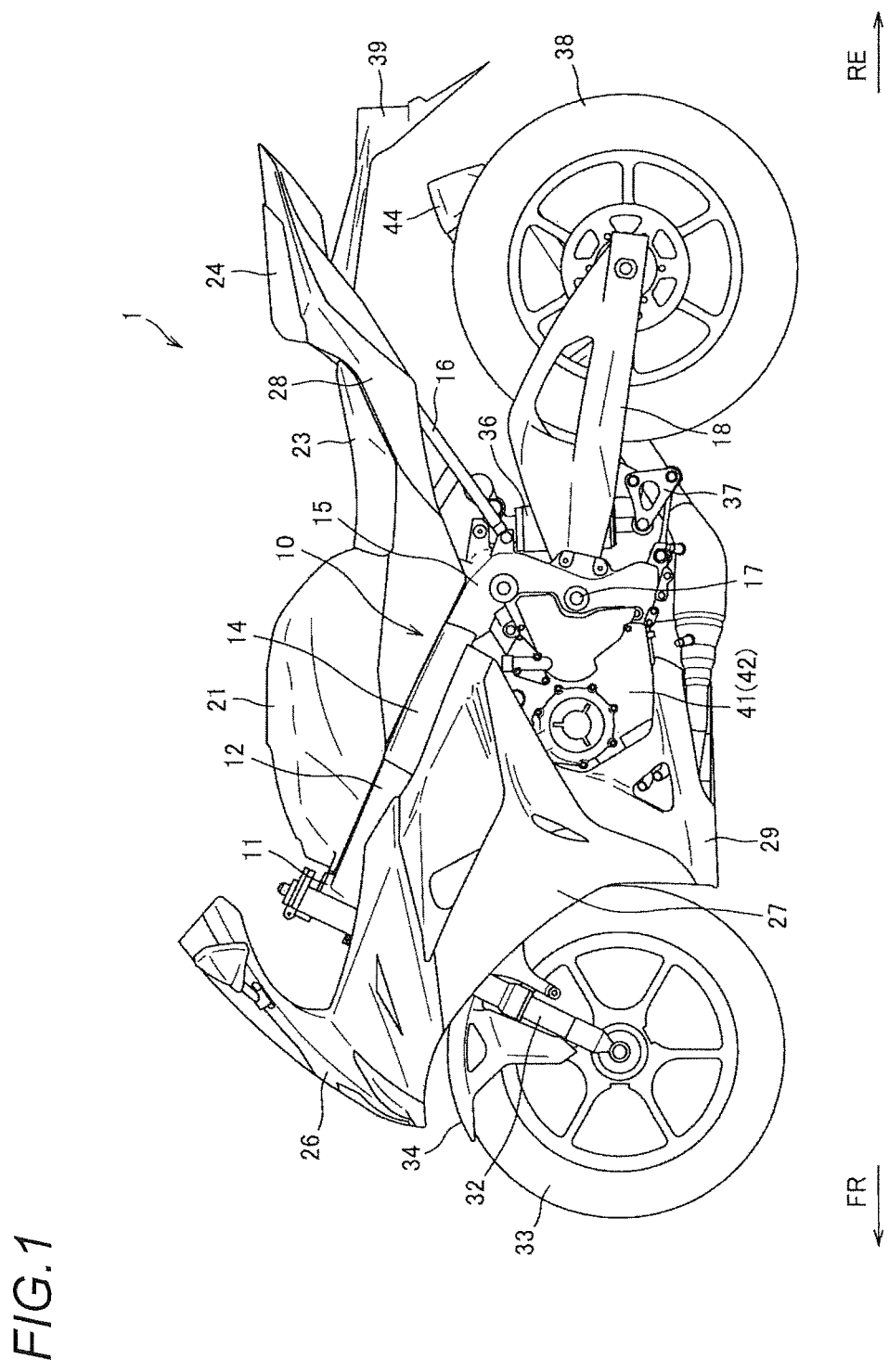
FIG. 1 is a left side view of a motorcycle according to the present embodiment.

Hereinafter, embodiments will be described in detail with reference to the accompanying drawings. Here, an example in which an installation structure of an oil control valve unit according to the present embodiment is applied to a sport-type motorcycle will be described, but the application target is not limited thereto and can be appropriately changed. For example, the oil control valve unit may be applied to other types of motorcycles. FIG. 1 is a left side view of the motorcycle according to the present embodiment. In the following drawings, the front of a vehicle body is indicated by an arrow FR, the rear of the vehicle body is indicated by an arrow RE, the left of the vehicle body is indicated by an arrow L, and the right of the vehicle body is indicated by an arrow R, respectively.

As shown in FIG. 1, the motorcycle 1 is configured by mounting various components such as an engine 41 and an electric system on a twin spar-type vehicle body frame 10 formed by aluminum casting. Main frames 12 of the vehicle body frame 10 branch leftward and rightward from a head pipe 11 and extend rearward. The pair of left and right main frames 12 is bent to wrap around the rear of the engine 41, and a rear side of the engine 41 is supported by a body frame 15 at the rear of the main frame 12. Down frames 13 (see FIG. 3) of the vehicle body frame 10 branch leftward and rightward from the head pipe 11 and extend downward, and a front side of the engine 41 is supported at lower portions of the pair of left and right down frames 13.

A part of a front side portion of the main frame 12 is a tank rail 14, and a fuel tank 21 is installed on the tank rail 14. A rear side portion of the main frame 12 is configured as the body frame 15, and a swing arm pivot 17 swingably supporting a swing arm 18 is formed at a substantially intermediate position of the body frame 15 in an upper-lower direction. A seat rail (not shown) and a back stay 16 extending rearward are provided on an upper portion of the body frame 15. A rider seat 23 and a pillion seat 24 connected to the fuel tank 21 is provided on the seat rail.

The vehicle body frame 10 is mounted with various covers as external parts of a vehicle body. For example, a front half part of the vehicle body is covered with a front cowl 26, a side surface of the vehicle body is covered with a side cowl 27. Also, the seat rail is covered with a rear cowl 28, and a front lower part of the engine 41 is covered with an under cowl 29. A pair of right and left front forks 32 is supported to be steerable to the head pipe 11 via a steering shaft (not shown). A front suspension for front wheel buffering is installed in the front fork 32. A front wheel 33 is rotatably supported by lower portions of the front forks 32, and the upper of the front wheel 33 is covered with a front fender 34.

The swing arm 18 extends rearward from the swing arm pivot 17. A rear suspension 36 for rear wheel buffering is provided between the swing arm 18 and the body frame 15. The rear suspension 36 has one end supported by an upper end side of the body frame 15 and the other end connected to the swing arm 18 via a suspension link 37. A rear wheel 38 is rotatably supported by a rear end of the swing arm 18. The engine 41 and the rear wheel 38 are coupled via a deceleration mechanism, and the power from the engine 41 is transmitted to the rear wheel 38 via the deceleration mechanism. The upper of the rear wheel 38 is covered with a rear fender 39 provided at a rear portion of the rear cowl 28.

The engine 41 is configured by attaching a cylinder head 43 (see FIG. 3) to a crankcase 42 in which a crankshaft (not shown) of a parallel four-cylinder engine or the like is housed. The engine 41 is supported by the vehicle body frame 10, so that the rigidity of the entire vehicle body is secured. Air is taken into the engine 41 through an intake pipe (not shown), and the air and fuel are mixed and supplied to a combustion chamber by a fuel injection device. Exhaust gas after combustion is discharged from a muffler 44 via an exhaust pipe (not shown) extending rearward on a right side surface of the engine 41.

For the engine 41 configured as described above, a variable valve timing system which controls driving timings of an intake valve in accordance with an operation state of the engine is adopted. An oil control valve unit 61 (see FIG. 3) is installed on an outer surface of the engine 41, and a hydraulic pressure for the variable valve timing system is controlled by the oil control valve unit 61. Power from the crankshaft is transmitted to the variable valve timing system via a cam chain, and the intake valve is moved at the driving timing controlled by the oil control valve unit 61.

The oil control valve unit 61 is partially inserted into an opening formed in an outer wall of the cylinder head 43, and an internal flow path of the oil control valve unit 61 communicates with an internal flow path of the cylinder head 43. At this time, the oil control valve unit 61 is screwed to an installation surface of the cylinder head 43 with bolts, so that the oil control valve unit 61 is strongly pressed against the installation surface. However, engine vibration occurs in a cylinder axial direction in the cylinder head 43, and the adhesion between the oil control valve unit 61 and the installation surface of the cylinder head 43 is reduced by this engine vibration.

Figure 2A:
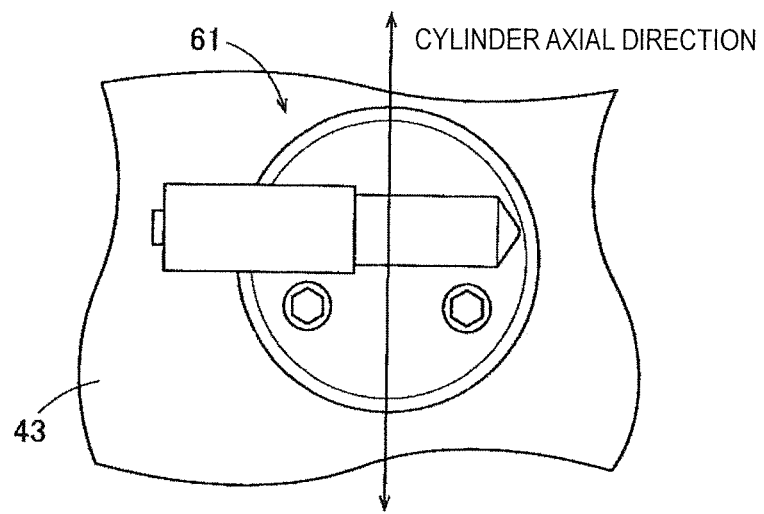
FIGS. 2A and 2B are illustrative views of an installation structure of an oil control valve unit according to a comparative example.
Figure 2B:
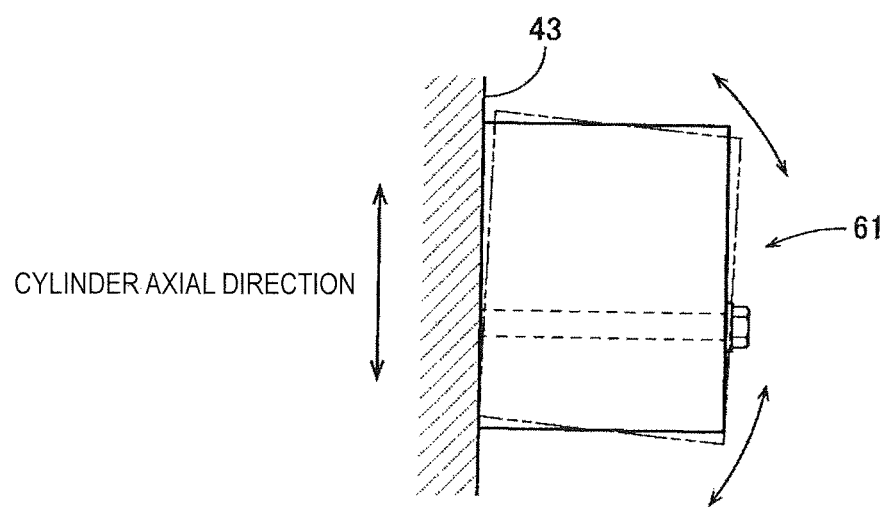

For example, as shown in a comparative example of FIG. 2A, the oil control valve unit 61 is screwed to the cylinder head 43 at two positions in the vehicle front-rear direction. However, as shown in FIG. 2B, in the cylinder axial direction, the oil control valve unit 61 is screwed to the cylinder head 43 at only one position. Therefore, a moment acts on a free end side of the oil control valve unit 61 due to the engine vibration in the cylinder axial direction, and the oil control valve unit 61 is shaken with a screwing point as a fulcrum. Therefore, in the present embodiment, the oil control valve unit 61 is screwed at two positions along the cylinder axial direction (see FIG. 3).

By forming an opening 83 (see FIG. 11A) in the outer wall of the cylinder head 43 for the oil control valve unit 61, the rigidity of the outer wall of the cylinder head 43 is reduced, and the engine vibration is increased. Therefore, vibration noise is increased, and it is difficult to ensure adhesion between the oil control valve unit 61 and an opening edge of the outer wall of the cylinder head 43. Therefore, in the present embodiment, a mating surface 88 of the cylinder head 43 and the crankcase 42 is fastened by a pair of bolts spaced apart from each other across the opening, and the reduction of the rigidity of the cylinder head 43 is suppressed by utilizing the rigidity of the crankcase 42 (see FIG. 12C).

Figure 3:
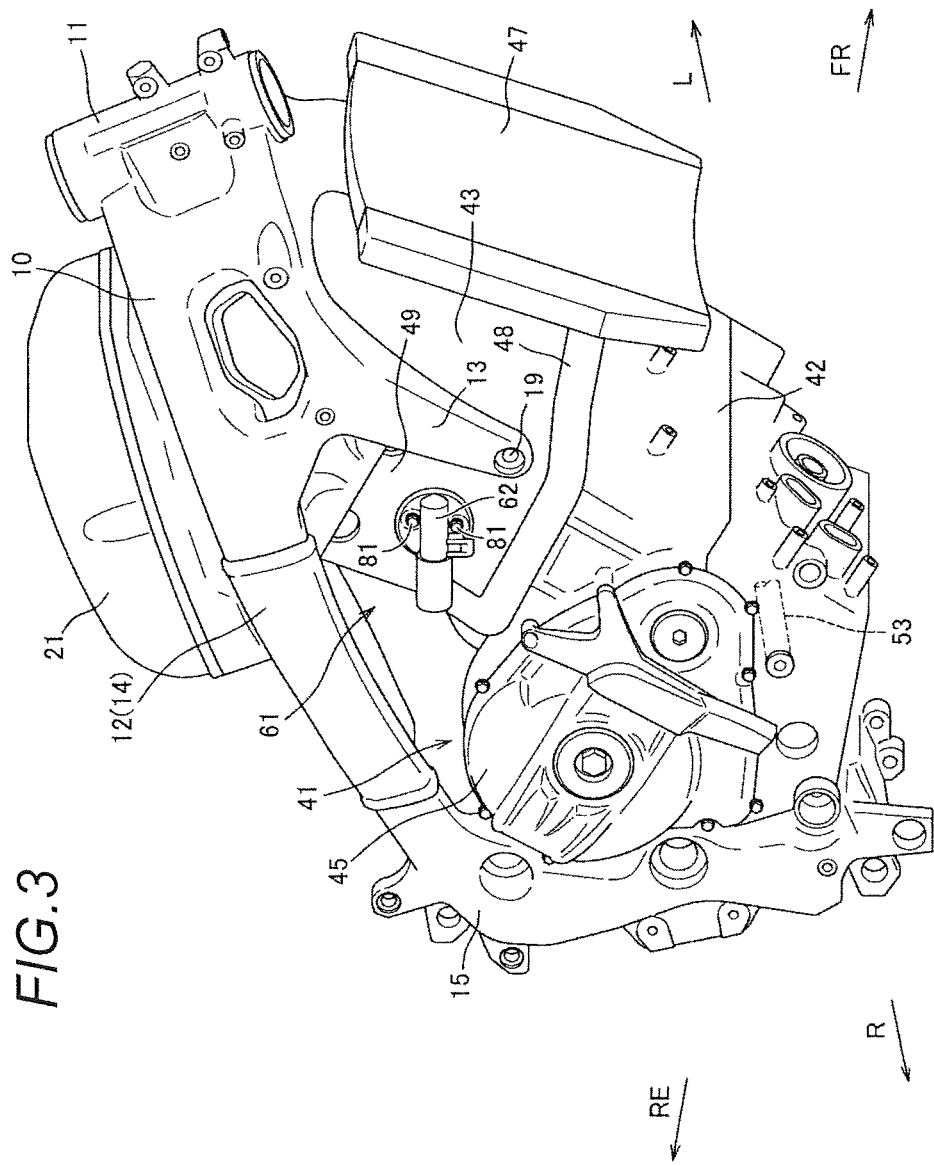
FIG. 3 is a perspective view of a periphery of an engine according to the present embodiment.
Figure 4:
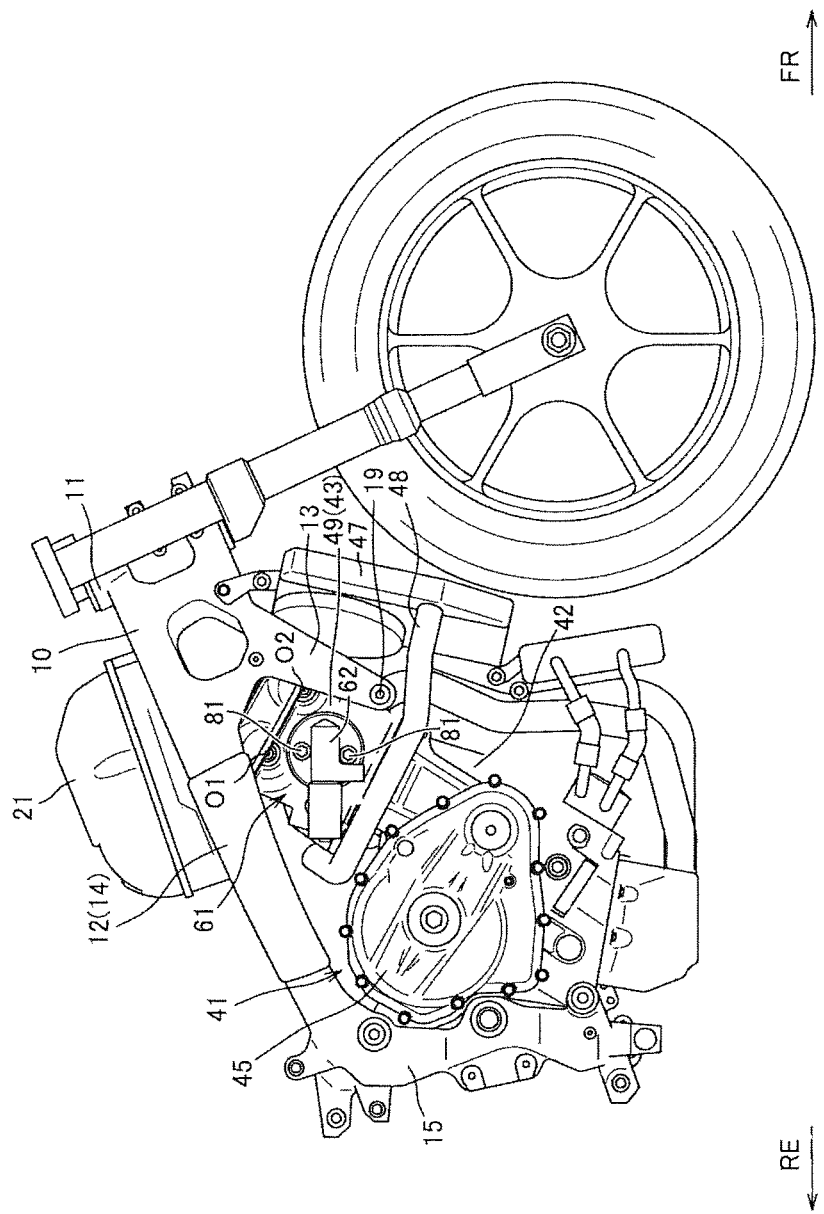
FIG. 4 is a right side view of a front half part of the motorcycle according to the present embodiment.
Figure 5:
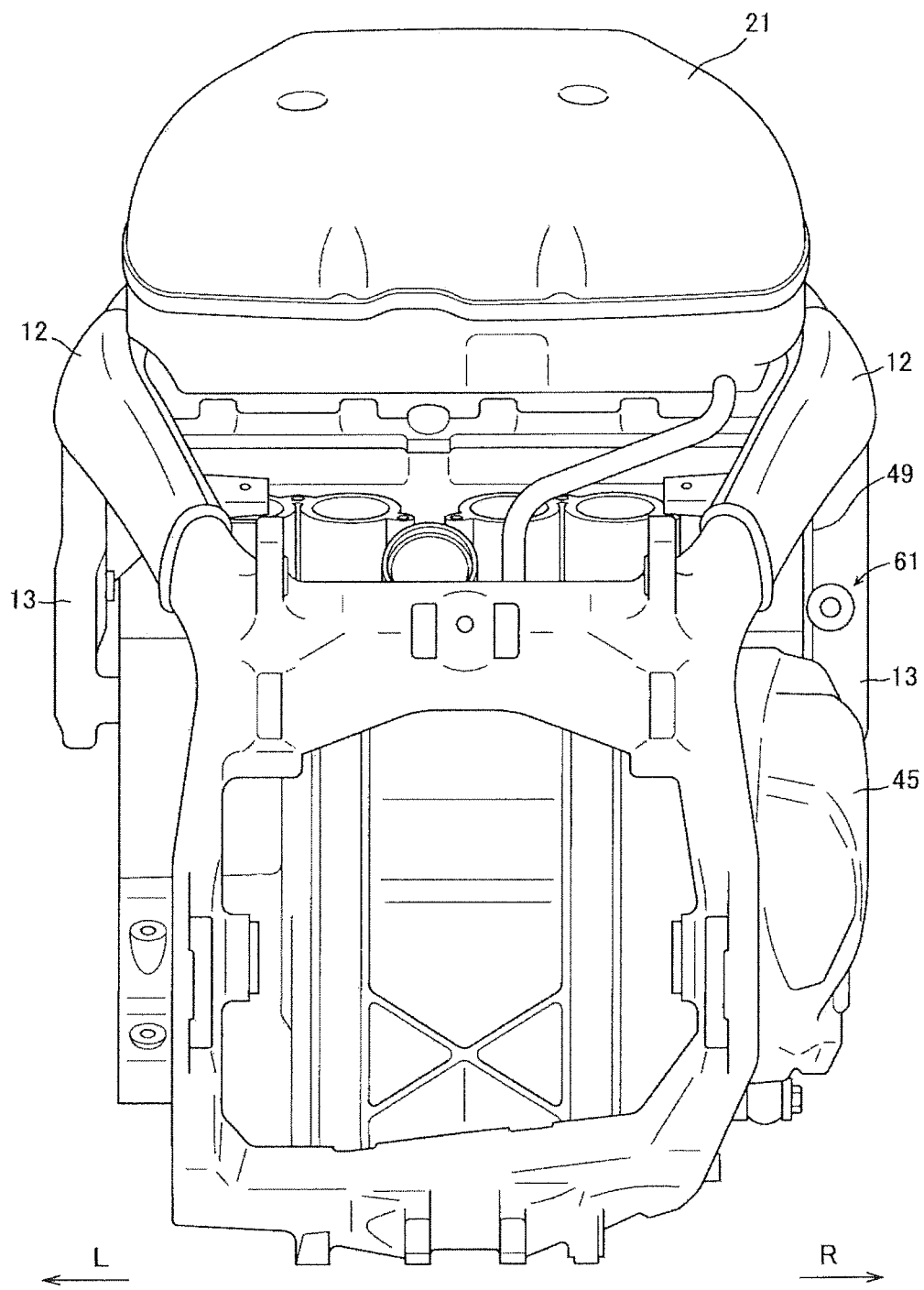
FIG. 5 is a back view of the periphery of the engine according to the present embodiment.
Figure 6A:
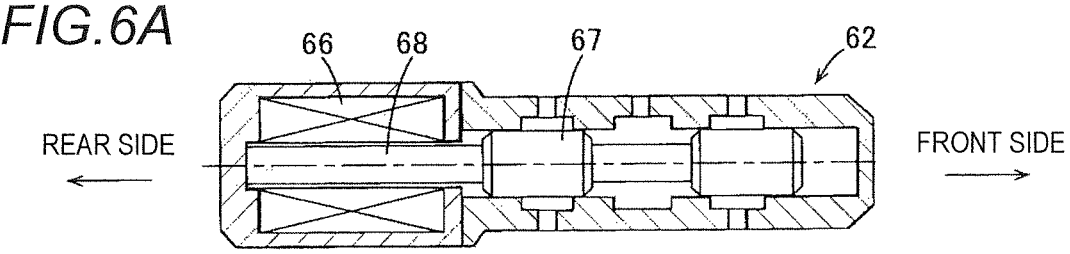
FIGS. 6A and 6B are schematic views of a control valve according to the present embodiment.
Figure 6B:
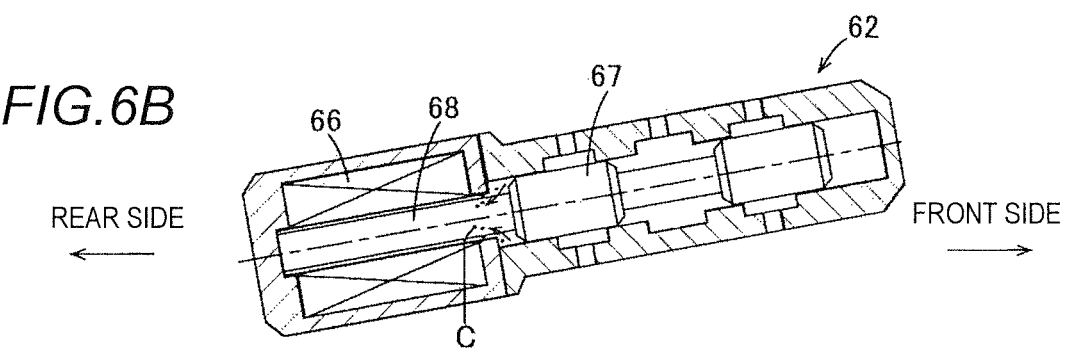

Hereinafter, the installation structure of the oil control valve unit according to the present embodiment is described with reference to FIGS. 3 to 6. FIG. 3 is a perspective view of a periphery of the engine according to the present embodiment. FIG. 4 is a right side view of a front half part of the motorcycle according to the present embodiment. FIG. 5 is a back view of the periphery of the engine according to the present embodiment. FIGS. 6A and 6B are schematic views of a control valve according to the present embodiment. In FIGS. 3 to 6B, various covers as external parts of the vehicle body are omitted for convenience of descriptions.

As shown in FIGS. 3 and 4, the engine 41 is supported by the vehicle body frame 10, and a radiator 47 is installed in front of the engine 41. The engine 41 is provided with the cylinder head 43 on the crankcase 42. The pair of left and right main frames 12 extends rearward from the head pipe 11 above the cylinder head 43, and the pair of left and right down frames 13 extends downward from the head pipe 11 in front of the cylinder head 43. The front side portion of the vehicle body frame 10 is bifurcated into the main frames 12 and the down frames 13, so that an installation space 49 of the oil control valve unit 61 is secured at a side (right side) of the cylinder head 43.

In this case, the down frames 13 are configured to support a front side of the engine 41. The down frames 13 support a front side of the cylinder head 43, and have a substantially triangular shape in which a width of the down frame 13 becomes wider gradually in a front-rear direction from a support position 19 to the engine 41 toward the head pipe 11. Unlike a structure in which a lower portion of the engine 41 is supported with the down frames 13, the cylinder head 43 provided at the upper portion of the engine 41 is supported with the down frames 13, so that it is possible to suppress the width of the down frame 13 from being widened in the front-rear direction and to secure the installation space 49 of the oil control valve unit 61 at a side of the cylinder head 43.

At a side of the engine 41, the oil control valve unit 61 is installed in the installation space 49 between the main frame 12 and the down frame 13, so that a space between the radiator 47 and the oil control valve unit 61 is blocked by the down frame 13. Accordingly, the heat from the radiator 47 is shielded by the down frame 13, which is a part of the vehicle body frame 10, so that the deterioration of the operation characteristics of the oil control valve unit 61 due to an increase in temperature is suppressed. Further, the oil control valve unit 61 is positioned between the main frame 12 and the down frame 13, so that the oil control valve unit 61 is protected from flying stones in front of the vehicle body.

Since the front of the oil control valve unit 61 is blocked by the down frame 13, the influence of heat from the radiator 47 is suppressed. However, the traveling wind is difficult to collide with the oil control valve unit 61. Therefore, regarding a pair of front and rear IN cam axis O1 and EX cam axis O2 of the cylinder head 43, the down frame 13 is configured to pass through a front side of the EX cam axis O2 and the main frame 12 is configured to pass through a rear side of the IN cam axis O1, so that the installation space 49 of the oil control valve unit 61 is widened. The installation space 49 is widened, so that the heat is difficult to be retained in the installation space 49 and an ambient temperature is thus lowered.

Further, a transmission is housed in the crankcase 42, and the engine case 42 is provided with a transmission cover 45 to cover the transmission from a side. The transmission cover 45 bulges sideward, and the oil control valve unit 61 is installed above the transmission cover 45. The oil control valve unit 61 is surrounded by the transmission cover 45, the main frame 12, and the down frame 13, and a space surrounded by the transmission cover 45, the main frame 12 and the down frame 13 is effectively utilized as the installation space 49. Accordingly, the oil control valve unit 61 is protected from the flying stones in front of the vehicle body by the down frame 13, and the oil control valve unit 61 is protected from the flying stones below the vehicle body by the transmission cover 45.

An upper portion of the transmission cover 45 is formed such that an interval with the oil control valve unit 61 becomes wider toward the front. The upper portion of the transmission cover 45 is inclined obliquely downward toward the front, and a vertical interval between the upper portion of the transmission cover 45 and the oil control valve unit 61 is increased. The transmission cover 45 and the oil control valve unit 61 are spaced apart from each other, so that the installation space 49 of the oil control valve unit 61 can be widened, the heat is difficult to be retained in the installation space 49 and the surrounding temperature is thus lowered. In this way, the installation space 49 having a sufficient area is secured at a side surface of the engine 41 by the main frame 12, the down frame 13 and the transmission cover 45.

The pair of left and right main frames 12 extends obliquely rearward from the head pipe 11, and a facing interval of the main frames 12 is narrowed at the rear of the installation space 49 of the oil control valve unit 61 (particularly, refer to FIG. 5). The oil control valve unit 61 is installed above the transmission cover 45. Accordingly, the air flow is not hindered at the rear of the oil control valve unit 61 by the main frames 12 and the transmission cover 45. The oil control valve unit 61 is exposed, as seen from the rear. Therefore, the heat flows rearward from the installation space 49 at the time of traveling, so that the oil control valve unit 61 is effectively cooled.

A radiator hose 48 extends rearward from the radiator 47, and the oil control valve unit 61 is installed above the radiator hose 48 at the side surface of the engine 41. The cooling water is supplied from the radiator 47 to the engine 41 by the radiator hose 48, and the oil control valve unit 61 is cooled by the cooling water in the radiator hose 48. Since the radiator hose 48 traverses immediately below the oil control valve unit 61, the oil control valve unit 61 is protected from the flying stones below the vehicle body by the radiator hose 48. Since the radiator hose 48 is formed of rubber or the like, the radiator hose 48 is difficult to be damaged due to the flying stones.

As shown in FIGS. 3 and 5, the oil control valve unit 61 overlaps the main frame 12 as seen from above, and overlaps the down frame 13 and the transmission cover 45 as seen from the front-rear direction. The oil control valve unit 61 overlaps the main frame 12 as seen from above, so that the main frame 12 functions as a rain shelter and a damage of the oil control valve unit 61 due to the rainwater is prevented. The oil control valve unit 61 overlaps the down frame 13 and the transmission cover 45 as seen from the front-rear direction, so that the oil control valve unit 61 is protected from the flying stones in front of the vehicle body and below the vehicle body, and the effect of shielding the heat from the radiator 47 by the down frame 13 is increased.

The oil control valve unit 61 is installed at a more inner side than all of the transmission cover 45, the main frame 12 and the down frame 13 as seen from the front-rear direction. The oil control valve unit 61 is protected from a shock upon turnover of the vehicle body and the other external shock by the transmission cover 45, the main frame 12, and the down frame 13. The oil control valve unit 61 is housed in the vehicle body frame 10 as seen from the front-rear direction, so that an increase in entire vehicle width dimension of the vehicle body is suppressed. Note that, the inner side as seen from the front-rear direction may be a more inner side than the outermost surfaces of the transmission cover 45, the main frame 12 and the down frame 13.

The oil control valve unit 61 is screwed to the installation space 49 of the cylinder head 43 at two positions by a pair of bolts 81. As described above, since the engine vibration is generated in the engine 41 in the cylinder axial direction (see FIG. 2), the vibration of the oil control valve unit 61 due to the engine vibration is suppressed by the pair of bolts 81 spaced apart from each other in the cylinder axial direction. Further, in the oil control valve unit 61, a cylindrical control valve 62 for controlling the valve timing on an air supply side is provided between the pair of bolts 81 in a horizontal posture.

As shown in FIG. 6A, the control valve 62 is a spool-type valve formed in a cylindrical shape, and is divided into a solenoid side in which a solenoid 66 is housed and a valve spool side in which a valve spool 67 is housed. The solenoid 66 is a so-called cylindrical conductive wire coil and generates a magnetic field by energization, thereby making the valve spool 67 connected to the iron core 68 on an inner side of the solenoid 66 advancing and retarding. By advance and retard of the valve spool 67, a supply destination of the oil in the control valve 62 is switched to an advance chamber or a retard chamber, the valve timing of the intake valve is adjusted.

The control valve 62 is likely to generate heat by the energization of the solenoids 66, and the operating characteristics are deteriorated due to the increase in temperature of the solenoid 66. Therefore, in the present embodiment, the solenoid 66 side of the control valve 62 faces rearward. Since the solenoid 66 is spaced from the radiator 47 (see FIG. 3) which is a heat source, heating of the solenoid 66 by the radiator 47 is suppressed, and the deterioration of the operating characteristics of the control valve 62 due to the increase in temperature of the solenoid 66 is suppressed. Further, the axis of the solenoid 66 of the control valve 62 preferably faces horizontally or obliquely upward toward the rear.

For example, as shown in a comparative example of FIG. 6B, when the axis of the solenoid 66 of the control valve 62 faces obliquely downward toward the rear, foreign matters such as contaminations C generated at the valve spool 67 side moves in the oil to the solenoid 66 side by its own weight. Therefore, the foreign matters such as contaminations C may be deposited at the solenoid 66 side. Therefore, in the present embodiment shown in FIG. 6A, the axis of the solenoid 66 faces horizontally or obliquely upward toward the rear (horizontally, in FIG. 6A). This makes it difficult for the foreign substances such as contaminations C generated at the valve spool 67 side to enter the solenoid 66 side, and the solenoid 66 is less likely to be damaged.

Figure 7:
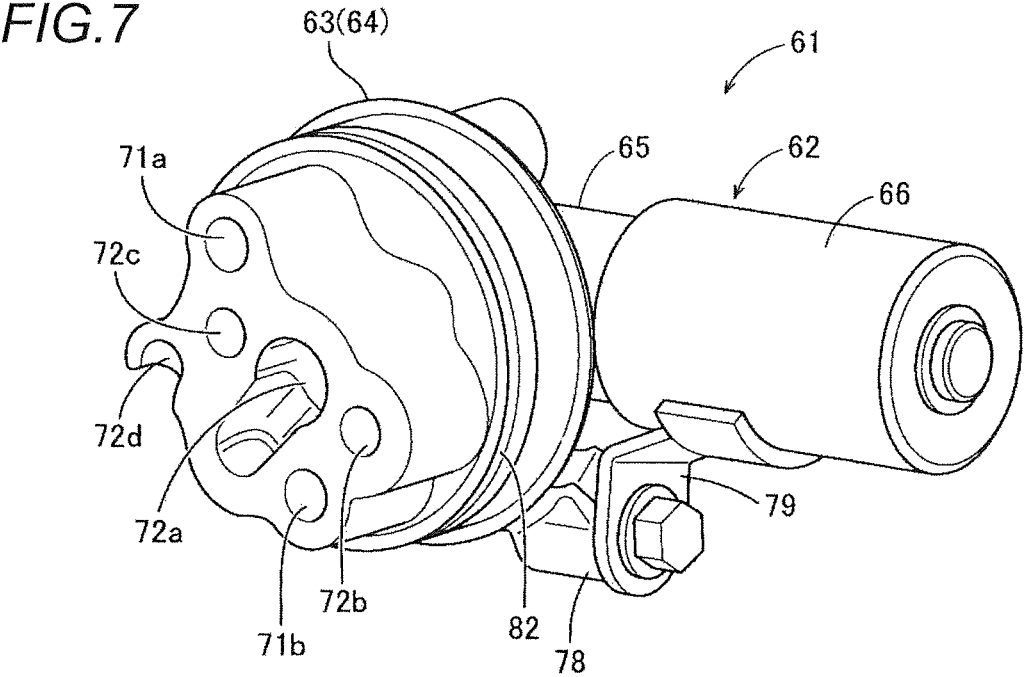
FIG. 7 is a perspective view of an oil control valve unit according to the present embodiment.
Figure 8A:
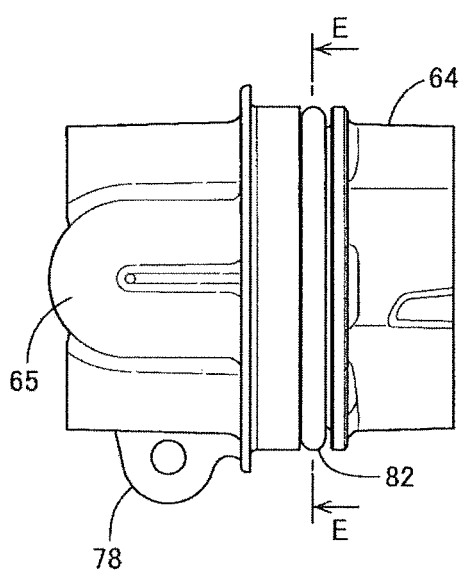
FIGS. 8A to 8D are plan views of a valve housing according to the present embodiment.
Figure 8B:
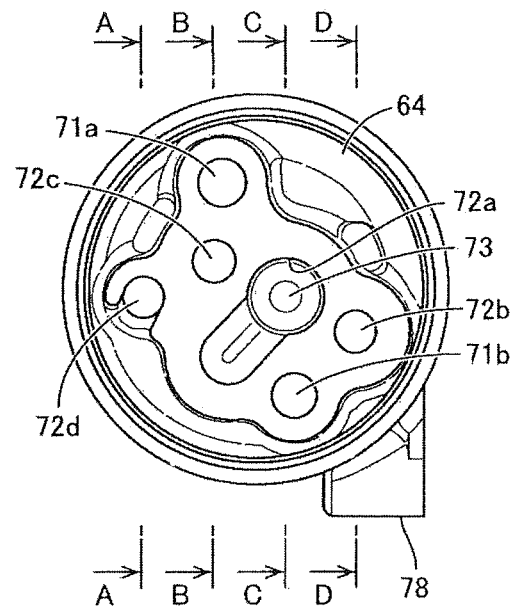
Figure 8C:
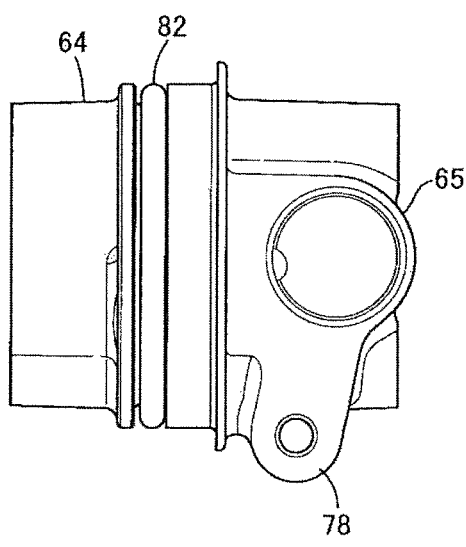
Figure 8D:
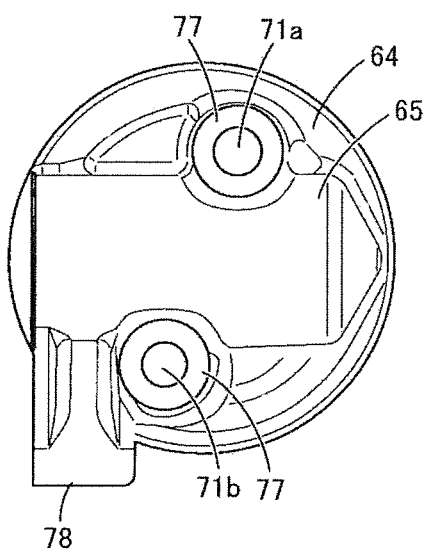
Figure 9A:
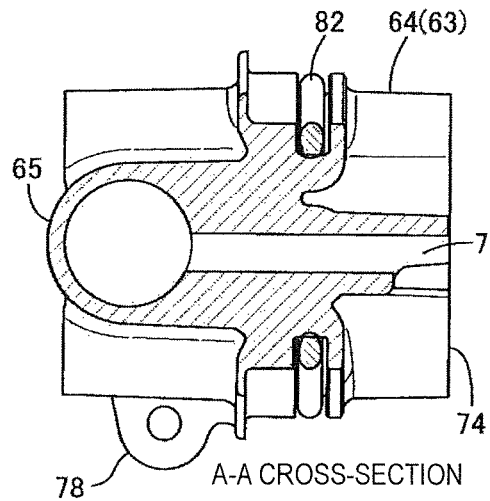
FIGS. 9A to 9E are cross-sectional views of the valve housing according to the present embodiment.
Figure 9B:
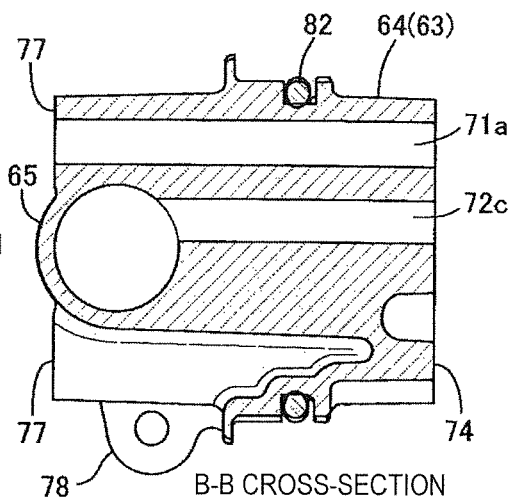
Figure 9C:
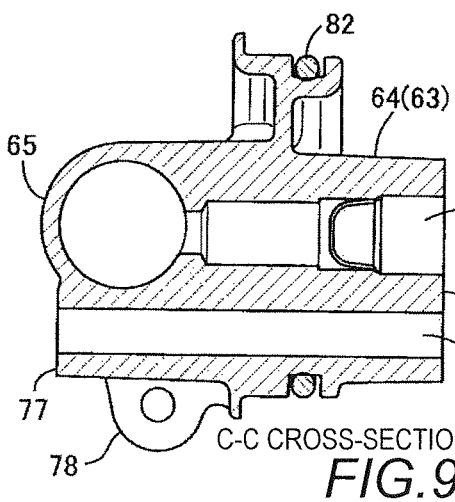
Figure 9D:
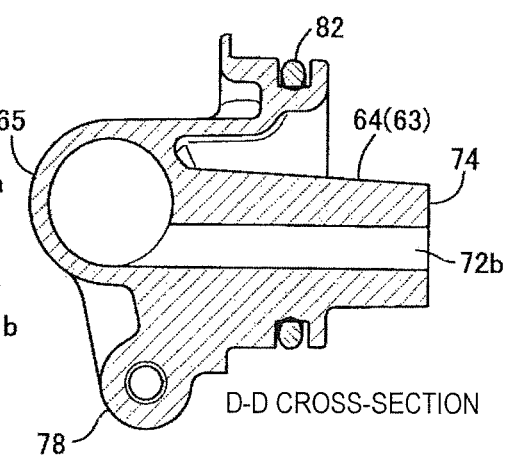
Figure 10A:
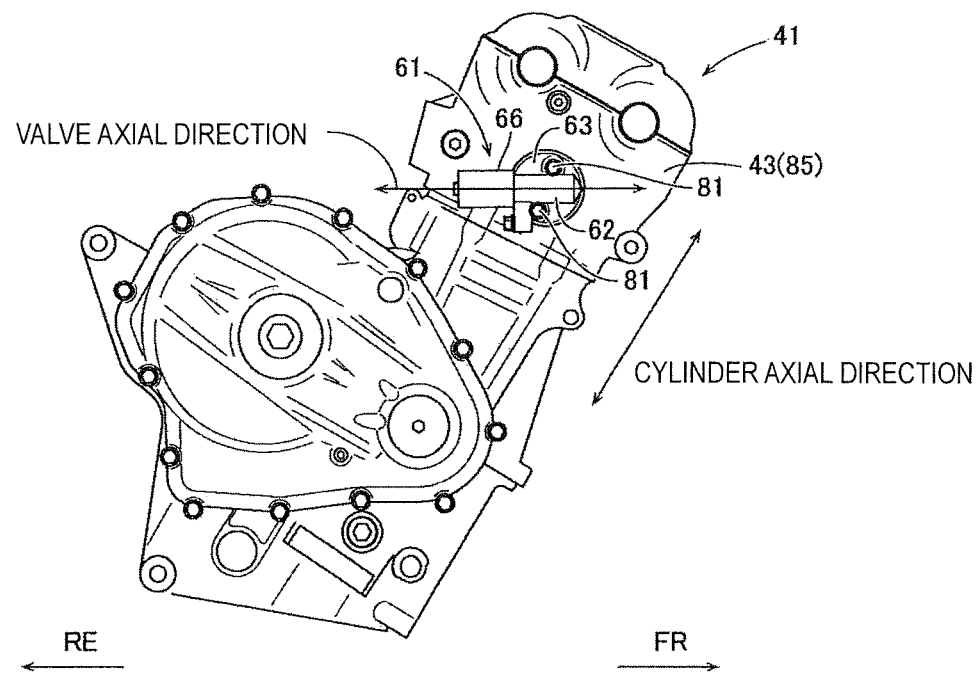
FIGS. 10A and 10B are installation views of an oil control valve according to the present embodiment.
Figure 10B:
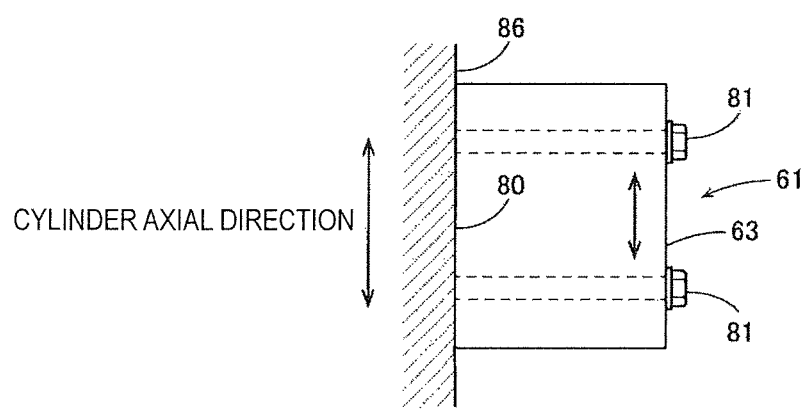
Figure 11B:
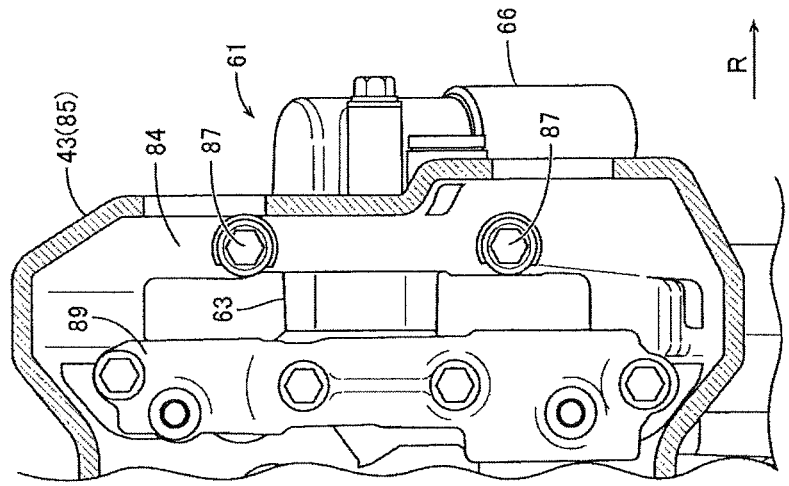
FIGS. 11A and 11B are partial cross-sectional views of a cylinder head according to the present embodiment.
Figure 11A:
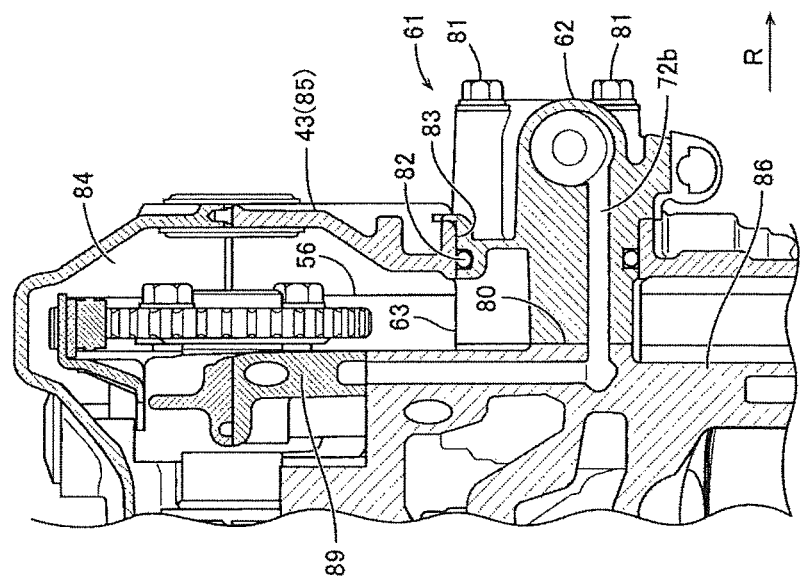

Hereinafter, the installation structure of the oil control valve unit is described with reference to FIGS. 7 to 12. FIG. 7 is a perspective view of the oil control valve unit according to the present embodiment. FIGS. 8A to 8D are plan views of a valve housing according to the present embodiment. FIGS. 9A to 9E are cross-sectional views of the valve housing according to the present embodiment. FIGS. 10A and 10B are installation views of the oil control valve according to the present embodiment. FIGS. 11A and 11B are partial cross-sectional views of the cylinder head according to the present embodiment. FIGS. 12A to 12C are illustrative views of a fastening structure of the cylinder head and the crankcase according to the present embodiment. In FIG. 8, the solenoid side is indicated by a two-dot chain line for convenience of descriptions.

As shown in FIG. 7, a valve housing 63 of the oil control valve unit 61 is integrally formed with a valve case 65 into which the valve spool (not shown) is inserted at an upper portion of the housing body 64 in which a plurality of oil passages are formed. The housing main body 64 is used by being inserted into the outer wall of the cylinder head 43 (see FIG. 11A), and an outer surface of the housing body 64 is mounted with an O-ring 82 for sealing a gap between the outer wall of the cylinder head 43 and the housing body 64. With the O-ring 82 as a boundary, the housing body 64 side is housed in the cylinder 43, and the valve case 65 side protrudes outward from the cylinder 43.

As shown in FIG. 7 and FIGS. 8A to 8D, a pair of mounting holes 71a, 71b for the bolts 81 (see FIG. 10A) are formed to penetrate through the housing body 64, and four oil ports (oil passages) 72a to 72d are formed toward the control valve 62. The respective oil ports are a supply port 72a, an advance angle port 72b, a retard port 72c, and a drain port 72d, and are connected to an inner side of the valve case 65 in which the valve spool is housed. When the communication state of the oil ports 72a to 72d is switched by the driving of the control valve 62, oil is supplied to the advance chamber or the retard chamber of the variable valve timing device.

The oil enters the supply port 72a at the center of the housing body 64, and the oil filtered by the filter 73 of the supply port 72a is supplied to the control valve 62. When the control valve 62 is switched, the supply port 72a communicates with one of the advance port 72b and the retard port 72c, and the drain port 72d communicates with one of the advance angle port 72b and the retard port 72c. Accordingly, the oil is supplied from the supply port 72a to one of the advance chamber or the retard chamber of the variable valve timing device, and the oil is discharged from the other through the drain port 72d.

As shown in FIGS. 9A to 9D, in the housing body 64, the oil ports 72a to 72d are formed straight from a lower surface 74 installed on a wall surface of the engine 41 toward the valve case 65. Therefore, the pressure loss due to the passage shape in the housing body 64 is reduced, the flow of the oil in each of the oil ports 72a to 72d becomes smooth, and the response performance of the variable valve timing device is improved. An outlet of the drain port 72d is partially cut out, and the oil can be discharged from a cutout portion 75 even when the lower surface 74 of the housing body 64 is installed on the wall surface of the engine 41.

Figure 9E:
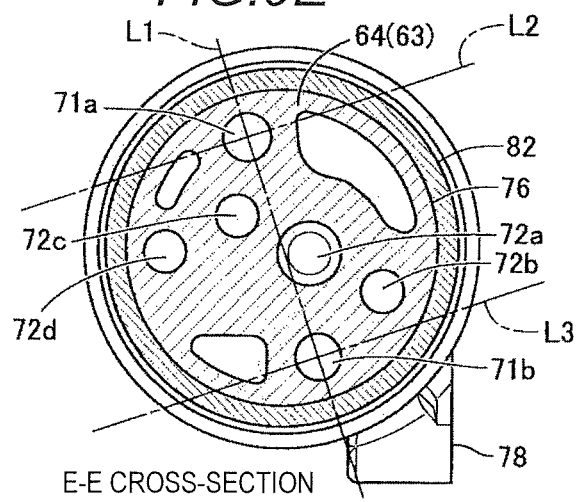

As shown in FIG. 9E, in the housing body 64, the oil ports 72a to 72d and the mounting holes 71a, 71b are formed by ensuring a sufficient thickness at an inner side of a ring groove 76 of the O-ring 82. Further, the oil ports 72a to 72d are disposed between straight lines L2 and L3 which pass through centers of the mounting holes 71a, 71b and perpendicular to a straight line L1 connecting the centers of the pair of mounting holes 71a, 71b. Since the valve case 65 is positioned at an inner side of the pair of mounting holes 71a, 71b (see FIG. 8D), the oil ports 72a to 72d communicate with the inside of the valve case 65 in a direction perpendicular to the lower surface of the housing body 64.

All of the oil ports 72a to 72d and the mounting holes 71a, 71b of the housing main body 64 are formed parallel to a die removing direction at the time of casting of the valve housing 63. Accordingly, the outer die forming an outer shape of the valve housing 63 and the casting pins forming the oil ports 72a to 72d and the mounting holes 71a, 71b of the valve housing 63 can be removed in the same direction at the time of casting, and the number of working steps can be reduced to improve productivity. In this way, each of the oil ports 72a to 72d of the oil control valve unit 61 is formed in a straight shape in consideration of not only the pressure loss of oil but also the number of manufacturing steps.

As shown in FIGS. 8D and 9B, a pair of bosses 77 where the mounting holes 71a, 71b are opened are formed at two positions sandwiching the valve case 65. The bosses 77 not only reinforce the mounting holes 71a, 71b but also reinforce the valve case 65 to increase the rigidity of the valve case 65. Further, a boss 78 to which a bracket 79 (see FIG. 7) of the solenoid 66 (see FIG. 7) is attached is integrally formed in one boss 77 to increase the rigidity. Accordingly, the housing body 64, the valve case 65, and the bosses 77, 78 are integrally formed, it is possible to increase an attachment rigidity of the solenoid 66 to the valve housing 63.

As shown in FIG. 10A, the oil control valve unit 61 is screwed to the cylinder head 43 by the pair of bolts 81 from sides. In this case, an outer wall 85 of the cylinder head 43 is opened in a circular shape, and the valve housing 63 is partially inserted into an opening part.

An inner wall 86 (see FIG. 10B) of the cylinder head 43 is formed with an installation surface 80 (see FIG. 10B) on which the valve housing 63 inserted through an opening is installed. Oil passages and screw holes (not shown) are formed in the installation surface 80 at positions corresponding to the oil ports 72a to 72d and the mounting holes 71a, 71b of the valve housing 63.

When the mounting holes 71a, 71b (see FIG. 7) of the valve housing 63 are aligned with the screw holes of the installation surface 80 (see FIG. 10B) and screwed by the pair of bolts 81, the oil control valve unit 61 is attached to the cylinder head 43. Accordingly, a mating surface of the valve housing 63 and the inner wall 86 (see FIG. 10B) of the cylinder head 43 is sealed liquid-tightly, and the oil ports 72a to 72c of the housing body 64 communicate with the oil passages of the inner wall of the cylinder head 43. At this time, the oil control valve unit 61 is screwed by the pair of bolts 81 at facing positions across the center of the valve housing 63 in a direction along the cylinder axial direction of the cylinder head 43.

The cylinder axial direction is a reciprocating direction of a piston in the engine 41, and engine vibration is mainly generated in the cylinder axial direction by the reciprocating motion of a piston in the cylinder head 43. Since the facing portions of the oil control valve unit 61 are fixed by the pair of bolts 81 in the direction along the cylinder axial direction, the vibration of the valve housing 63 due to the engine vibration in the cylinder axial direction is suppressed. Accordingly, the adhesion of the oil control valve unit 61 to the installation surface 80 (see FIG. 10B) of the cylinder head 43 is ensured, and sealing performance of the oil passages is improved by the mating surface of the valve housing 63 and the inner wall 86 of the cylinder head 43.

More specifically, as shown in FIG. 10B, the oil control valve unit 61 is screwed to the installation surface 80 of the cylinder head 43 at two positions across the center of the valve housing 63 in the cylinder axial direction. Therefore, even if a moment acts on A free end side of the valve housing 63 due to the engine vibration in the cylinder axial direction, the vibration of the valve housing 63 due to the moment at both ends in the cylinder axial direction is strongly suppressed. Since the oil control valve unit 61 vibrates integrally with the cylinder head 43, the adhesion of the mating surface of the valve housing 63 and the inner wall 86 of the cylinder head 43 is not reduced by the engine vibration.

Further, in the valve housing 63, the oil ports 72a to 72d are formed closer to the center of the valve housing 63 than the pair of mounting holes 71a, 71b in the cylinder axial direction (see FIG. 9E). Since the valve housing 63 and the installation surface 80 of the cylinder head 43 are in close contact with each other at an inner side of the pair of bolts 81, oil leakage is prevented at the mating surface of the valve housing 63 and the cylinder head 43. Thus, high sealing performance can be maintained even in the oil ports 72a to 72d where the hydraulic pressure is high. Since oil leakage from the valve housing 63 is suppressed and the oil is maintained at a sufficient pressure, the response performance of the variable valve timing device is not deteriorated.

Referring back to FIG. 10A, the valve housing 63 is installed on the cylinder head 43 such that a valve axial direction of the control valve 62 intersects the cylinder axial direction. When the valve axial direction intersects the engine vibration in the cylinder axial direction, a vibration component of the engine vibration in the valve axial direction with respect to the control valve 62 can be reduced. Thus, operation stability can be improved by suppressing an erroneous operation of the control valve 62 due to the vibration component in the valve axial direction. In this case, in order to effectively reduce the vibration component in the valve axial direction, it is preferable that the valve axial direction intersects the cylinder axial direction at 45 degrees or more and 90 degrees or less.

As shown in FIGS. 11A and 11B, a chain chamber 84 of a cam chain 56 that transmits power to the variable valve timing device is formed in the cylinder head 43 and the crankcase 42 (see FIG. 12B). The outside of the chain chamber 84 is partitioned by the outer wall 85 of the cylinder head 43 and the crankcase 42, the inside of the chain chamber 84 is partitioned by the inner wall 86 of the cylinder head 43 and the crankcase 42. As described above, the opening 83 is formed in the outer wall 85 of the cylinder head 43, and the oil control valve unit 61 is installed so as to be partially inserted into the opening 83 through the inner side of the cam chain 56.

The configuration of installing a member at the inner side of the cam chain 56 is not preferable from a standpoint of the mounting workability. However, the oil control valve unit 61 is detachably mounted, so that the oil control valve unit 61 is not an obstacle upon the mounting of the cam chain 56. In case of the motorcycle 1 (refer to FIG. 1) and the like, a chain cover is integrated with the cylinder 43, and it is not possible to demount only the chain cover from the cylinder 43. When a member is installed at the inner side of the cam chain 56, the member becomes an obstacle upon attachment of the cam chain 56 to the engine 41 later.

Therefore, in the present embodiment, the oil control valve unit 61 is configured to be detachably mounted, and after the cam chain 56 is mounted to the engine 41, the valve housing 63 of the oil control valve unit 61 is inserted to the inner side of the cam chain 56. Accordingly, interference does not occur upon the mounting of the cam chain 56, and a dead space of the inner side of the cam chain 56 is effectively used. The valve housing 63 of the oil control valve unit 61 is configured to pass through the inner side of the cam chain 56, so that the oil control valve unit 61 is brought close to the variable valve timing device.

Thus, the internal flow path from the main gallery 53 (see FIG. 14) to the oil control valve unit 61 is long, and the internal flow path at the advance side and the retard side from the oil control valve unit 61 to the variable valve timing device is shortened. Although the flow path structure is complicated on a downstream side of the oil control valve unit 61, the pressure loss is minimized by shortening the internal flow path of the oil control valve unit 61 and the variable valve timing device. Thus, oil is sent from the main gallery 53 to the oil control valve unit 61 at a high hydraulic pressure, and it is possible to apply the high hydraulic pressure to the variable valve timing device.

The chain chamber 84 is widened at the inner side of the cylinder head 43, and the opening 83 communicating with the chain chamber 84 is formed in the outer wall 85 of the cylinder head 43. Therefore, the cylinder head 43 and the crankcase 42 are fastened by a pair of bolts 87 to compensate for the rigidity of the outer wall 85 of the cylinder head 43. By increasing the rigidity of the outer wall 85 of the cylinder head 43, vibration noise is reduced, and the sealing performance between the O-ring 82 mounted on the outer peripheral surface of the valve housing 63 and the inner peripheral surface of the opening 83 is improved. Further, since the bolts 87 are not provided on the inner wall 86 of the cylinder head 43, the cam housing 89 can be installed on the inner wall 86.

More specifically, as shown in FIGS. 12A and 12B, the mating surface 88 of the cylinder head 43 and the crankcase 42 is fastened by the pair of bolts 87 spaced apart from each other across the opening 83 of the cylinder head 43. The pair of bolts 87 is inserted into mounting holes of the cylinder head 43 from above and screwed into screw holes of the crankcase 42 through the sides of the opening 83. At this time, the attachment of the oil control valve unit 61 is not hindered by the pair of bolts 87. Further, the rigidity of the cylinder head 43 is improved by fastening the cylinder head 43 to the crankcase 42 in which sufficient rigidity is secured.

Particularly, since the pair of bolts 87 fasten the cylinder head 43 to the crankcase 42 from the cylinder axial direction, the engine vibration in the cylinder axial direction is effectively suppressed by the pair of bolts 87. The pair of bolts 87 is formed in a long shape that is strong against compressive load and weak against shear load. Therefore, the shear load due to the engine vibration is suppressed with the axial direction of the bolts 87 facing the cylinder axial direction. The outer wall 85 of the cylinder head 43 is provided with a suspension bracket 59 suspending a front surface of the engine 41 with the vehicle body frame 10 (see FIG. 1). Although the suspension bracket 59 is provided near the opening 83 of the cylinder head 43, the rigidity of the cylinder head 43 near the opening 83 is increased, thereby increasing the fastening rigidity of the suspension bracket 59 to the vehicle body frame 10.

As shown in FIGS. 12A and 12C, the valve housing 63 of the oil control valve unit 61 is installed below a sprocket 112 at the inner side of the cam chain 56 with the outlet of the drain port 72d in a positioning state of facing downward. The outlet of the drain port 72d faces the inner peripheral surface of the cam chain 56, and the cam chain 56 is lubricated with the oil dropped from the outlet of the drain port 72d. By supplying the oil to the inner peripheral surface of the cam chain 56, the meshing position of the cam chain 56 and the sprocket 112 is appropriately lubricated, and the durability of the cam chain 56 and the sprocket 112 is improved.

In this case, it is preferable that no member is present on the supply path of the oil which falls from the outlet of the drain port 72d to the cam chain 56. By directly supplying the oil from the outlet of the drain port 72d to the inner peripheral surface of the cam chain 56, the amount of oil supplied to the cam chain 56 can be sufficiently ensured. As described above, with a simple structure in which the oil discharged from the drain port 72d of the oil control valve unit 61 is used, the cam chain 56 can be well lubricated without providing a dedicated oil passage, a chain jet, or the like in the cylinder head 43.

Further, as the valve housing 63 abuts on the inner wall 86 (see FIG. 11A) of the cylinder head 43, the control valve 62 is spaced apart from the outer surface of the cylinder head 43. That is, the solenoid 66 of the oil control valve unit 61 is separated from the outer surface of the cylinder head 43 in the vehicle width direction. Therefore, the solenoid 66 of the oil control valve unit 61 does not come into contact with the outer surface of the cylinder head 43, and the increase in temperature of the solenoid 66 due to the heat from the cylinder head 43 is suppressed. Thus, the deterioration of the operating characteristics of the oil control valve unit 61 is effectively suppressed.

Figure 13:
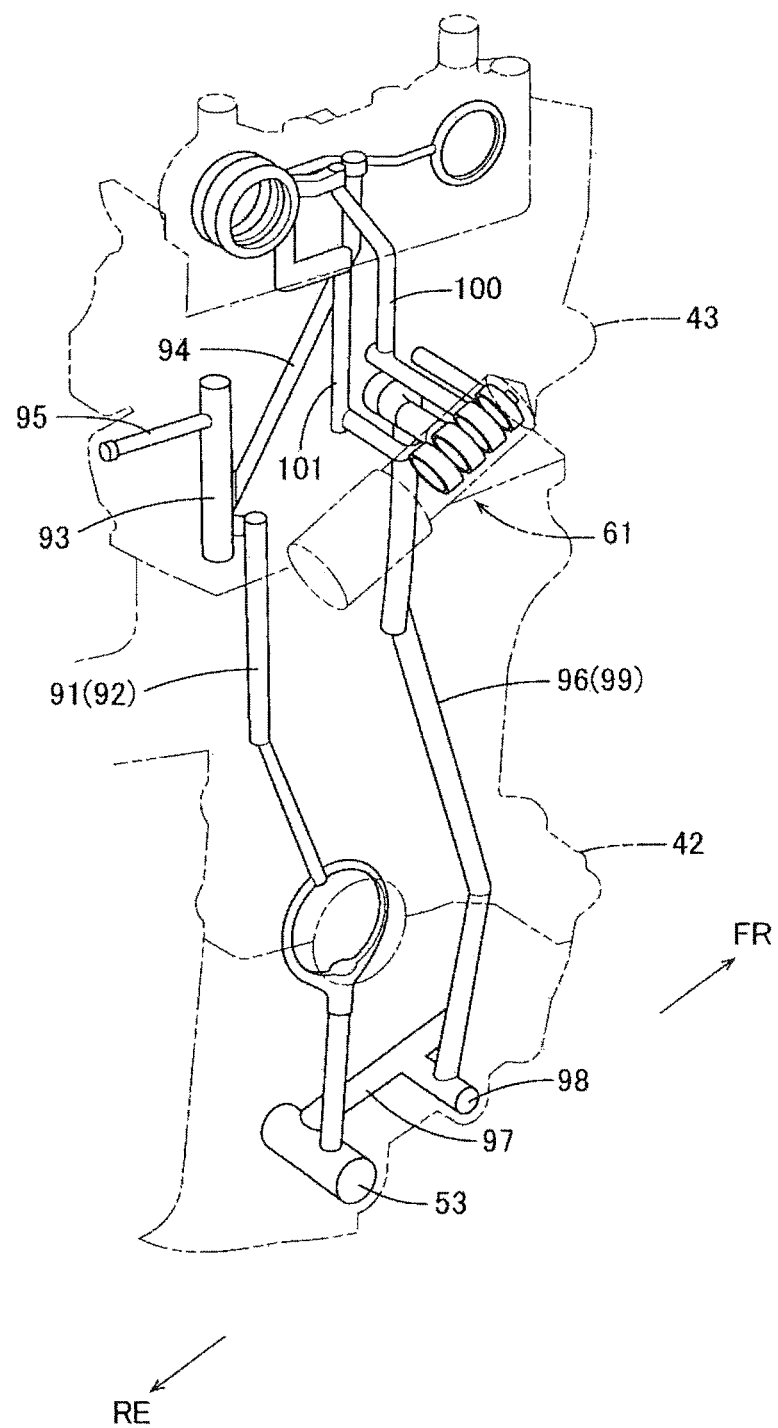
FIG. 13 is a perspective view showing a flow path structure of an engine according to the present embodiment.
Figure 14:
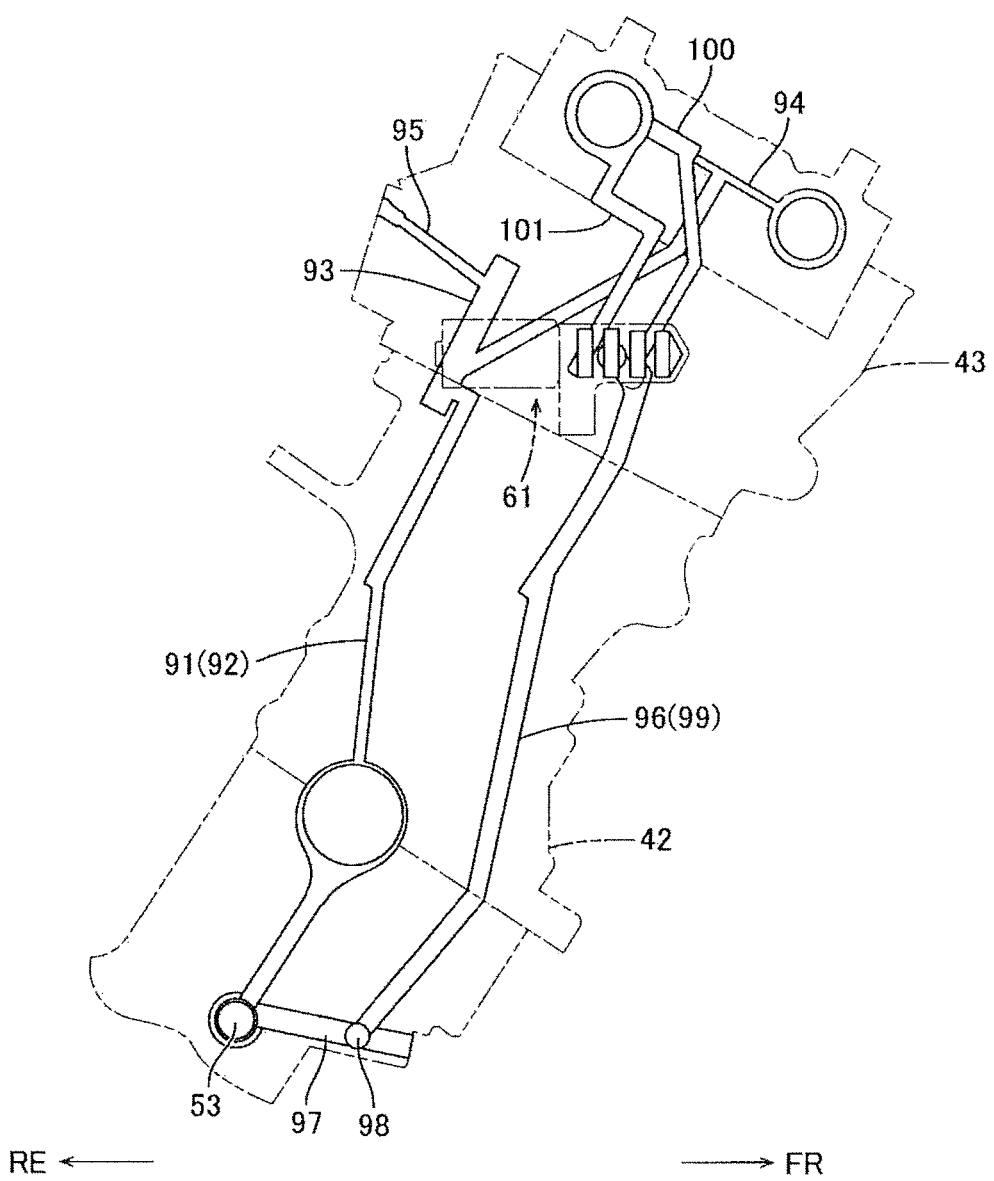
FIG. 14 is a side view showing the flow path structure of the engine according to the present embodiment.

The flow path structure of the engine will be described with reference to FIGS. 13 and 14. FIG. 13 is a perspective view showing a flow path structure of the engine according to the present embodiment. FIG. 14 is a side view showing the flow path structure of the engine according to the present embodiment. In FIGS. 13 and 14, for convenience of descriptions, the outer shape of the member is indicated by a two-dot chain line, the oil passage is indicated by a solid line.

As shown in FIGS. 13 and 14, the main gallery 53 through which the oil is sent from an oil pump 52 (see FIG. 15) is formed in the crankcase 42. A first oil passage 91 directed to the valve system via a bearing of a crankshaft (not shown) and a second oil passage 96 directed to the advance chamber or retard chamber of the variable valve timing device 110 (see FIG. 15) via the oil control valve unit 61 are connected to the main gallery 53. Since the first and second oil passages 91, 96 are branched into two independent hydraulic circuits by the main gallery 53, it is possible to ensure high hydraulic pressure without being greatly affected by each other.

The first oil passage 91 includes an in-case passage 92 extending toward the cylinder head 43 side through the bearing of the crankshaft, a branch passage 93 extending in the cylinder axial direction, and supply passages 94, 95 for camshafts and a chain adjuster branched by the branch passage 93. The supply passage 94 for the camshafts extends obliquely forward from a lower end side of the branch passage 93, and branches halfway toward bearings of the pair of camshafts. The supply passage 95 for the chain adjuster extends obliquely rearward from an upper end side of the branch passage 93. Although the first oil passage 91 is branched in various ways, appropriate hydraulic pressure is ensured for the chain adjuster and the camshafts.

The first half of the second oil passage 96 includes a bypass passage 97 extending forward from the main gallery 53, a parallel passage 98 extending parallel to the main gallery 53 from the midway of the bypass passage 97, and a supply passage 99 extending from the parallel passage 98 to the cylinder head 43 bypassing the crankshaft. Since the bypass passage 97 and the parallel passage 98 are formed at substantially the same height as the main gallery 53, a high hydraulic pressure also acts on the bypass passage 97 and the parallel passage 98 similar to that acting on the main gallery 53. The supply passage 99 is connected at a shortest distance from the parallel passage 98 to the oil control valve unit 61 to supply high hydraulic pressure to the oil control valve unit 61.

The supply passage 99 of the second oil passage 96 combines a plurality of straight passages, and is formed substantially parallel to the in-case passage 92 of the first oil passage 91. At the time of manufacturing the crankcase 42, the supply passage 99 of the second oil passage 96 and the in-case passage 92 of the first oil passage 91 are formed by removing core pins from the same direction, thereby improving the productivity. The second half of the second oil passage 96 includes an advance passage 100 directing from the oil control valve unit 61 to the advance chamber and a retard passage 101 directing from the oil control valve unit 61 to the retard chamber.

A bend exists in the advance passage 100 and the retard passage 101, and a bend loss of the oil occurs in the advance passage 100 and the retard passage 101. However, the oil control valve unit 61 is installed near the variable valve timing device 110 (see FIG. 15), and since the advance passage 100 and the retard passage 101 are formed short, the pressure loss in the passage is suppressed. In the second oil passage 96, the oil is supplied to the oil control valve unit 61 with high hydraulic pressure by the supply passage 99, and the oil can be sent from the oil control valve unit 61 to the advance passage 100 or the retard passage 101 with high hydraulic pressure.

As described above, since the hydraulic pressure for the variable valve timing device 110 (see FIG. 15) can be maintained high by the second oil passage 96, the variable valve timing device 110 can be operated from low rotation to improve drivability. Further, since the first and second oil passages 91, 96 form an independent hydraulic circuit, the first oil passage 91 of the valve system is less likely to be influenced by the hydraulic pressure drop of the second oil passage 96 at the time of operation of the variable valve timing device 110. Thus, a lubricating property of the valve system is improved, and the responsiveness of the variable valve timing device 110 can be improved.

Figure 15:
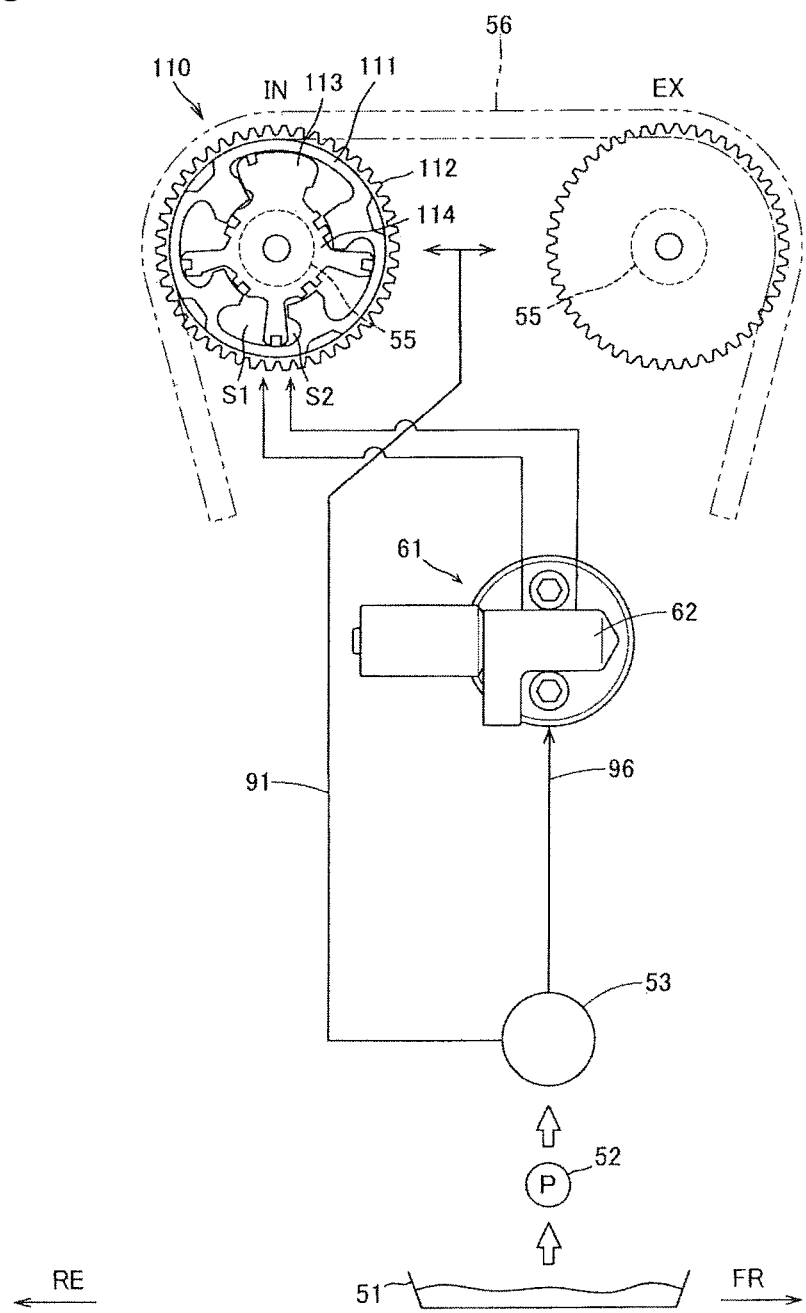
FIG. 15 is a schematic view of a variable valve timing system according to the present embodiment.

Next, the variable valve timing system will be briefly described with reference to FIG. 15. FIG. 15 is a schematic view of the variable valve timing system according to the present embodiment. Although the variable valve timing system on an intake side will be described, variable valve timing systems may be provided on both the intake side and an exhaust side. In FIG. 15, for convenience of descriptions, the cam chain is indicated by a two-dot chain line.

As shown in FIG. 15, the variable valve timing system varies the valve timing by changing the rotational phases of the camshafts 55 with respect to a crankshaft (not shown), and includes the hydraulic pressure-type variable valve timing device 110. Power from the crankshafts is transmitted to the camshafts 55 by the cam chain 56 via the variable valve timing device 110. The variable valve timing device 110 is provided at one end portion of the camshaft 55, and is configured to transmit the power to the camshaft 55 via the oil supplied therein.

A case 111 of the variable valve timing device 110 is fixed to the sprocket 112 on which the cam chain 56 is put. The sprocket 112 is rotatably supported by one end portion of the camshaft 55 together with the case 111. Further, a rotor 114 having vanes 113 is fixed to one end portion of the camshaft 55, and is housed to be relatively rotatable inside the case 111. A plurality of hydraulic pressure chambers is formed at an inner side of the case 92, and each vane 113 of the rotor 114 is housed in each hydraulic pressure chamber. Each hydraulic pressure chamber is partitioned into an advance chamber S1 and a retard chamber S2 by each vane 113.

The advance chamber S1 and the retard chamber S2 are configured to communicate with the oil paths formed in the camshaft and the cam housing. When a volume of the advance chamber S1 is increased by the hydraulic pressure, the rotor 114 is rotated relative to the case 111 toward the advance side. Thereby, the camshaft 55 fixed to the rotor 114 rotates, so that the valve timing changes toward the advance side. On the other hand, when a volume of the retard chamber S2 is increased by the hydraulic pressure, the rotor 114 is rotated relative to the case 111 toward the retard side. Thereby, the camshaft 55 fixed to the rotor 114 rotates, so that the valve timing changes toward the retard side.

The variable valve timing device 110 is operated by the hydraulic pressure from the oil control valve unit 61. The oil is pumped up from an oil pan 51 to the main gallery 53 via a filter or the like by the oil pump 52, and the oil is supplied to the intake control valve 62 of the oil control valve unit 61 through the crankcase and the internal flow path of the cylinder head. Then, the communication states between the advance port, the retard port, the input port and the exhaust port of the control valve 62 are switched, so that the variable valve timing is switched to the advance side or retard side.

At this time, the first oil passage 91 of the valve system and the second oil passage 96 for the oil control valve unit 61 are formed in the crankcase and the cylinder head. Since the second oil passage 96 is branched at the main gallery 53 and forms a hydraulic circuit independent of the first oil passage 91, the hydraulic pressure of the second oil passage 96 is not used for other hydraulic circuits. Further, since the second oil passage 96 is formed by combining substantially linear passages with minimal bending, pressure loss in the passage such as hydraulic bending loss of the second oil passage 96 is suppressed (see FIG. 13).

Further, since the oil control valve unit 61 is installed near the variable valve timing device 110, the oil can be sent out to the vicinity of the variable valve timing device 110 through the second oil passage 96 with high hydraulic pressure. Thus, the oil is supplied from the control valve 62 to the variable valve timing device 110 with high hydraulic pressure, and the response speed of the variable valve timing device 110 is increased. Further, the dead space at the inner side of the cam chain 56 can be effectively used in the oil passage of the oil control valve unit 61, and the oil passage inside the engine is not complicated.

Figure 16A:
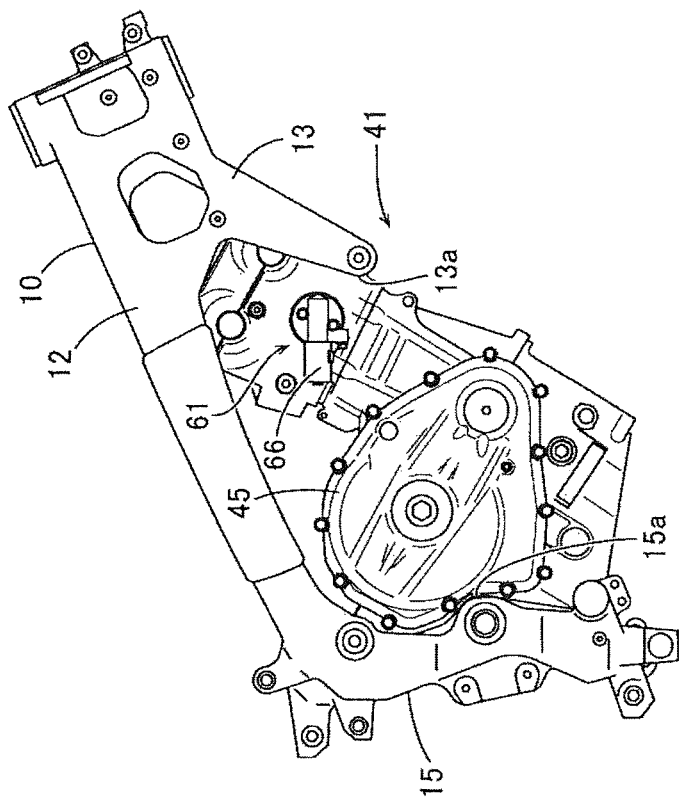
FIGS. 16A and 16B are views showing an example of an assembling operation of a vehicle body frame according to the present embodiment.
Figure 16B:
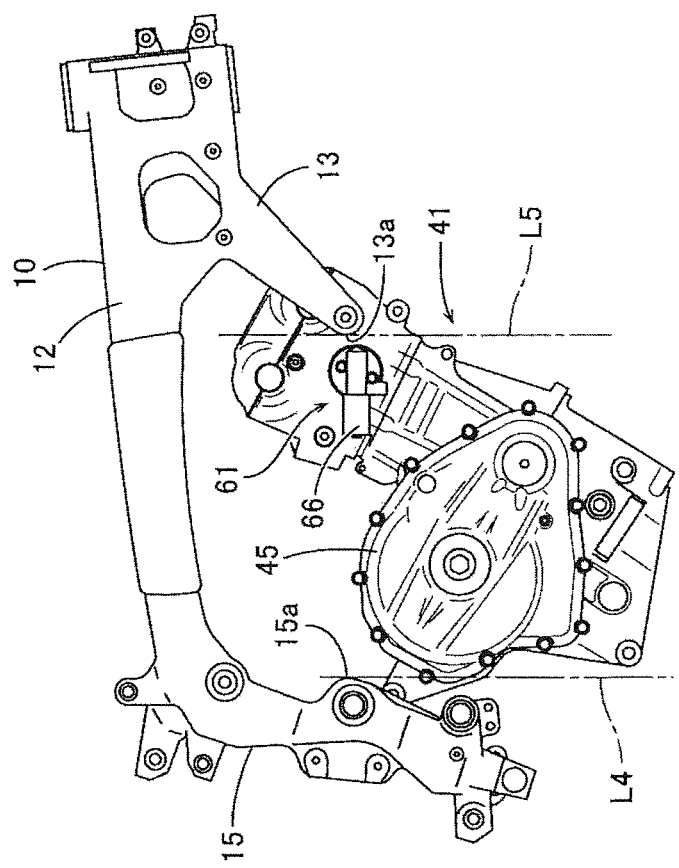

Next, an assembling operation of the vehicle body frame will be described with reference to FIGS. 16A and 16B. FIGS. 16A and 16B are views showing an example of the assembling operation of the vehicle body frame according to the present embodiment.

As shown in FIGS. 16A and 16B, the transmission cover 45 bulges from a side surface of the engine 41, and a rear side portion of the vehicle body frame 10 is formed with the body frame 15 surrounding (turning around rearward) a part of a bulging portion of the transmission cover 45 from the rear. Further, the front side portion of the vehicle body frame 10 is bifurcated into the main frame 12 and the down frame 13, and a space for the oil control valve unit 61 is secured between the main frame 12 and the down frame 13. The oil control valve unit 61 is installed such that the solenoid 66 faces the rear of the engine 41 so as to avoid the vehicle body frame 10.

In this case, the oil control valve unit 61 and the bulging portion of the transmission cover 45 are installed between a forefront part 15a of the body frame 15 below the transmission cover 45 and a last part 13a of the down frame 13, in the front-rear direction of the vehicle body. When the vehicle body frame 10 is downward mounted from the upper of the engine 41 in the vertical direction, moving loci L4, L5 are depicted by the forefront part 15a of the body frame 15 and the last part 13a of the down frame 13. Since the moving loci L4, L5 deviate from the oil control valve unit 61 and the transmission cover 45, it is possible to mount the vehicle body frame 10 to the engine 41 in a state where the oil control valve unit 61 is installed on a side surface of the cylinder 43.

As described above, according to the present embodiment, the opening 83 of the cylinder head 43 is avoided, and the cylinder head 43 and the crankcase 42 are fastened by the pair of bolts 87. It is possible to secure the fastening rigidity of the cylinder head 43 and the crankcase 42 without hindering the attachment of the oil control valve unit 61 by the pair of bolts 87. Even if the opening 83 is formed in the outer wall 85 of the cylinder head 43, the rigidity of the cylinder head is not significantly reduced and the fastening rigidity of the cylinder head 43 and the crankcase 42 is also high, so that the vibration noise can be reduced.

Note that, in the present embodiment, the parallel four-cylinder engine is exemplified as the engine, but the present invention is not limited to this configuration. The configuration of the engine is not particularly limited, for example, a single cylinder engine, a parallel two-cylinder engine, a V-shaped engine, a horizontal opposed type engine, an in-line two-cylinder engine, or the like.

In the present embodiment, the twin spar frame is exemplified as the vehicle body frame, but the present invention is not limited to this configuration. The vehicle body frame may have any shape capable of securing the installation space of the oil control valve unit for the engine. For example, the vehicle body frame may be configured by a cradle frame.

In the present embodiment, the oil control valve unit is installed on the right side of the engine, but the oil control valve unit may be installed on the left side of the engine.

In the present embodiment, the oil control valve unit is installed on a side of the cylinder, but the present invention is not limited to this configuration. The oil control valve unit may be installed on a side of the engine. For example, the oil control valve unit may be installed on a side of the engine case.

In the present embodiment, a spool valve is illustrated as the oil control valve unit, but the present invention is not limited to this configuration. The oil control valve unit may have any configuration capable of controlling the hydraulic pressure to the variable timing device of the engine, and the type of the valve is not particularly limited.

In the present embodiment, the oil control valve unit includes the intake control valve, but the present invention is not limited to this configuration. The oil control valve unit may include any one of the intake control valve and the exhaust control valve.

In the present embodiment, the oil is supplied to the oil control valve unit through the internal flow path extending from the main gallery, but the present invention is not limited to this configuration. The oil may be supplied to the oil control valve unit from an external pipe extending from the main gallery.

In the present embodiment, the outlet of the drain port is directed to the inner peripheral surface of the cam chain, but the present invention is not limited to this configuration. The outlet of the drain port may be directed to the outer peripheral surface of the cam chain, or the outlet of the drain port may not be directed to the cam chain.

In the present embodiment, the oil control valve unit is installed on the cylinder head, but the present invention is not limited to this configuration. The oil control valve unit may be installed on the engine. For example, the oil control valve unit may be installed on the crankcase.

Further, in the present embodiment, the mating surface of the cylinder head and the crankcase is fastened by the pair of bolts, but the present invention is not limited to this configuration. The mating surface of the cylinder head and the crankcase may be fastened so as to avoid the opening of the cylinder head. For example, the mating surfaces of the cylinder head and the crankcase may be fastened by three or more bolts.

In this embodiment, the mating surface of the outer wall of the cylinder head and the outer wall of the crankcase is configured to be fastened, but the present invention is not limited to this configuration. The mating surface of the inner wall of the cylinder head and the inner wall of the crankcase may be fastened.

In the present embodiment, the mating surface of the cylinder head and the crankcase is fastened such that the axial direction of the bolts is directed in the axial direction, but the present invention is not limited to this configuration. The mating surface of the cylinder head and the crankcase may be fastened such that the axial direction of the bolts is directed in a direction intersecting with the cylinder axial direction.

In the present embodiment, the opening is formed in the outer wall of the cylinder head such that the oil control valve unit passes through the inner side of the cam chain, but the present invention is not limited to this configuration. The opening may be formed in the outer wall of the cylinder head such that the oil control valve unit passes through the outer side of the cam chain.

In the present embodiment, the vehicle body frame can be assembled to the engine by installing the valve housing on the engine such that the solenoid faces the rear of the engine, but the present invention is not limited to this configuration. The valve housing may be installed in the engine such that the solenoid faces the front of the engine. Since the oil control valve can be attached later, the vehicle body frame can be assembled to the engine.

Although the present embodiment and the modification have been described, the present embodiment and the modification may be combined in whole or in part as another embodiment of the present invention.

The technology of the present disclosure is not limited to the above embodiment and modification, and various changes, substitutions and alterations may be made without departing from the technical spirit. Further, when the technical spirit of the present invention can be implemented with other methods by advance in technology or by the other deriving technology, the present invention can be implemented using the methods. Therefore, the claims cover all implementations that can be included in the technical spirit of the present invention.

In the present embodiment, although the configuration in which the present invention is applied to the motorcycle is described, but the present invention is not limited this configuration. The present invention can be appropriately applied to other vehicles in which the oil control valve unit is installed, for example, a special machine such as a jet ski, a lawn trimmer, an outboard motor and the like, in addition to an automatic four-wheeled vehicle and a buggy-type motor tricycle.

Features of the above embodiment are summarized below.

The assembling structure of the engine described in the embodiment is an assembling structure of an engine in which a cylinder head on which an oil control valve unit configured to control oil pressure in a variable valve timing device of the engine is installed is assembled to a crankcase, wherein an outer wall of the cylinder head is formed with an opening into which the oil control valve unit is partially inserted, and a mating surface of the cylinder head and the crankcase is fastened by at least a pair of bolts spaced apart across the opening. According to the configuration, the cylinder head and the crankcase are fastened by the pair of bolts so as to avoid the opening of the cylinder head. It is possible to ensure the fastening rigidity of the cylinder head and the crankcase without hindering the attachment of the oil control valve unit by the pair of bolts. Even if the opening is formed in the outer wall of the cylinder head, the rigidity of the cylinder head is not significantly reduced and the fastening rigidity of the cylinder head and the crankcase is also high, so that the vibration noise can be reduced.

In the engine assembly structure described in the above embodiment, the cylinder head and crankcase are formed with a chain chamber for a cam chain which transmits power to the variable valve timing device, and the outer wall of the cylinder head is formed with an opening such that the oil control valve unit passes an inner side of the cam chain. According to this configuration, the oil control valve unit does not come into contact with the cam chain, and a dead space at the inner side of the cam chain can be effectively used.

In the engine assembly structure described in the above embodiment, an outside of the chain chamber is partitioned by the outer wall of the cylinder head and an outer wall of the crankcase in a width direction of the engine, and a mating surface of the outer wall of the cylinder head and the outer wall of the crankcase is fastened by a pair of bolts. According to this configuration, the rigidity in the vicinity of the opening of the outer wall of the cylinder head can be increased by increasing the fastening rigidity of the mating surface of the outer wall of the cylinder head and the outer wall of the crankcase.

In the assembling structure of the engine described in the above embodiment, the inside of the chain chamber is partitioned by an inner wall of the cylinder head and an inner wall of the crankcase in a width direction of the engine, and the cam housing is installed on the inner wall of the cylinder head. According to this configuration, the cam housing can be installed on the inner wall of the cylinder head without being disturbed by the bolts.

In the engine assembling structure according to the embodiment described above, the pair of bolts fastens the mating surface of the cylinder head and the crankcase with the axial direction thereof being directed in the cylinder axial direction. According to this configuration, the engine vibration in the cylinder axial direction can be effectively suppressed by the pair of bolts. Further, since the axial direction of the bolts is directed in the cylinder axial direction, a shear load acting on the bolts due to the engine vibration is suppressed.

In the assembling structure of the engine described in the above embodiment, the cylinder head is provided with a suspension bracket which suspends a front surface of the engine with a vehicle body frame. According to this configuration, it is possible to increase the fastening rigidity of the suspension bracket of the cylinder head with respect to the vehicle body frame by increasing the fastening rigidity of the cylinder head and the crankcase.

In the assembling structure of the engine described in the above embodiment, the oil control valve unit includes an oil control valve which controls a flow of oil, and a valve housing which supports the oil control valve, and the outer peripheral surface of the valve housing is mounted with a seal material filling a space between inner peripheral surfaces of the opening. According to this configuration, by enhancing the fastening rigidity of the cylinder head and the crankcase, the vibration of the opening of the cylinder head can be suppressed, and the sealing performance of the opening and the valve housing can be improved.

The motorcycle described in the above embodiment includes the assembling structure of the engine. According to this configuration, it is possible to suppress the vibration noise of the engine of the vehicle by ensuring the fastening rigidity of the cylinder head and the crankcase.

What is claimed is:

1. An assembling structure of an engine, in which a cylinder head on which an oil control valve unit configured to control oil pressure in a variable valve timing device of the engine is installed is assembled to a crankcase,
    wherein an outer wall of the cylinder head is formed with an opening into which the oil control valve unit is partially inserted,
    wherein the cylinder head and the crankcase are fastened by at least a pair of bolts spaced apart across the opening,
    wherein mounting holes are formed in a mating surface of the outer wall of the cylinder head and screw holes are formed in a mating surface of an outer wall of the crankcase, and
    the pair of bolts is inserted into the mounting holes of the cylinder head from above and screwed into the screw holes of the crankcase, passing through sides of the opening to fasten the cylinder head to the crankcase in a cylinder axial direction.

2. The assembling structure of the engine, according to claim 1,
    wherein a chain chamber for a cam chain configured to transmit power to the variable valve timing device is formed in the cylinder head and the crankcase, and
    wherein the opening is formed in the outer wall of the cylinder head such that the oil control valve unit passes through an inner side of the cam chain.

3. The assembling structure of the engine, according to claim 2,
    wherein an outside of the chain chamber is partitioned by the outer wall of the cylinder head and the outer wall of the crankcase in a width direction of the engine, and
    wherein the outer wall of the cylinder head and the outer wall of the crankcase area fastened by the pair of bolts.

4. The assembling structure of the engine, according to claim 2,
    wherein an inside of the chain chamber is partitioned by an inner wall of the cylinder head and an inner wall of the crankcase in a width direction of the engine, and
    wherein a cam housing is installed on the inner wall of the cylinder head.

5. The assembling structure of the engine, according to claim 1, wherein the pair of bolts fastens the cylinder head and the crankcase with an axial direction thereof being directed in the cylinder axial direction.

6. The assembling structure of the engine, according to claim 1, wherein the cylinder head is provided with a suspension bracket which suspends a front surface of the engine with a vehicle body frame.

7. The assembling structure of the engine, according to claim 1,
    wherein the oil control valve unit includes a control valve configured to control flow of oil, and a valve housing supporting the control valve, and
    wherein an outer peripheral surface of the valve housing is mounted with a seal material filling a space between inner peripheral surfaces of the opening.

8. A vehicle comprising the assembling structure according to claim 1.

9. The assembling structure of the engine, according to claim 1,
    wherein a chain chamber for a cam chain configured to transmit power to the variable valve timing device is formed in the cylinder head and the crankcase,
    wherein an outside of the chain chamber is partitioned by the outer wall of the cylinder head and the outer wall of the crankcase in a width direction of the engine,
    wherein an inside of the chain chamber is partitioned by an inner wall of the cylinder head and an inner wall of the crankcase in the width direction of the engine,
    wherein the opening communicates with the chain chamber,
    wherein the oil control valve unit is partially inserted into the chain chamber, and
    wherein the outer wall of the cylinder head and the outer wall of the crankcase are fastened by the pair of bolts which are inserted into the mounting holes to be spaced apart across the opening.

10. The assembling structure of the engine, according to claim 1,
    wherein the engine is provided with two sprockets, and
    wherein as seen in a side view, the opening and the pair of bolts are positioned between an imaginary line passing through a rotating shaft of one of the sprockets and extending in the cylinder axial direction and an imaginary line passing through a rotating shaft of another of the sprockets and extending in the cylinder axial direction.

* * * * *